(12) United States Patent
Brumley et al.

(10) Patent No.: US 6,282,151 B1
(45) Date of Patent: *Aug. 28, 2001

(54) SYSTEM AND METHOD FOR MEASURING WAVE DIRECTIONAL SPECTRUM AND WAVE HEIGHT

(75) Inventors: Blair H. Brumley, La Jolla, CA (US); Eugene A. Terray, Falmouth, MA (US); Brandon S. Strong, San Diego, CA (US)

(73) Assignee: Rowe-Deines Instruments, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,743

(22) Filed: Feb. 1, 2000

Related U.S. Application Data

(63) Continuation of application No. 09/128,422, filed on Aug. 4, 1998, now Pat. No. 6,052,334.

(51) Int. Cl.[7] .................................................. G01S 15/58
(52) U.S. Cl. ........................................................... 367/90
(58) Field of Search .................................. 367/90, 89, 87; 73/861.18, 861.25; 600/441; 702/48

(56) References Cited

U.S. PATENT DOCUMENTS

| 4,062,237 | 12/1977 | Fox ..................................... 73/861.25 |
| 5,208,785 | 5/1993 | Brumley et al. ........................ 367/90 |
| 5,521,883 | 5/1996 | Fage et al. ............................. 367/90 |
| 6,052,334 | * 4/2000 | Brumley et al. ........................ 367/90 |

FOREIGN PATENT DOCUMENTS 2128833A    5/1984    (GB).

OTHER PUBLICATIONS

Kirlin, R. Lynn, Estimation of Transfer Function Parameters with Output Fourier Transform Sensitivity Vectors. 1997 IEEE International Conference on Acoustics, Speech, and Signal Processing (Cat. No. 97CB36052) Munich, Germany, Apr. 21–24 1997, pp. 3933–3936 vol.5.

Terray E., et al., Measuring Waves and Currents with an Upward–Looking ADCP, IEEE 1999, pp. 66–71.

Glad, I.K., et al. (1992) The maximum–likelihood property of estimators of wave parameters from heave, pitch, and roll buoys. American Meteorological Society V.9:169–173.

(List continued on next page.)

*Primary Examiner*—Daniel T. Pihulic
(74) *Attorney, Agent, or Firm*—Knobbe, Martens, Olson & Bear, LLP

(57) ABSTRACT

A system and method for measuring the directional spectrum of one or more waves in a fluid medium using a multi-beam sonar system. In an exemplary embodiment, range cells located within a plurality of acoustic beams are sampled to provide current velocity data. Optionally, wave surface height and pressure data is obtained as well. This velocity, wave height, and pressure data is Fourier-transformed by one or more signal processors within the system, and a surface height spectrum produced. A cross-spectral coefficient matrix at each observed frequency is also generated from this data. A sensitivity vector specifically related to the ADCP's transducer array geometry is used in conjunction with maximum likelihood method (MLM), iterative maximum likelihood method (IMLM), or other similar methods to solve a the wave equation at each frequency and produce a frequency-specific wave directional spectrum. Ultimately, the frequency-specific spectra are combined to construct a complete two-dimensional wave directional spectrum. The system is also capable of measuring current profile as a function of depth in conjunction with wave direction and wave height.

16 Claims, 20 Drawing Sheets

OTHER PUBLICATIONS

Hashimoto, N., et al. (1996) Improvement of submerged Doppler–type directional wave meter and its application to field observations. Coastal Engineering 629–642.

Herbers, T.H., et al. (1991) Field Verification of Acoustic Doppler Surface Gravity Wave Measurements. Journal of Geophysical Research V.96,No.C9:17,023–17,035.

Krogstad, H.E., et al. (1988) High–resolution directional wave spectra from horizontally mounted acoustic Doppler current meters. Journal of Atmospheric and Oceanic Technology V.5,No.4:340–352.

Pinkel, R., et al. (1987) Open ocean surface wave measurement using Doppler sonar. Journal of Geophysical Research V.92,No.C12:12,967–12,973.

Smith, J. A. (1989) Doppler sonar and surface waves: range and resolution. Journal of Atmospheric and Oceanic Technology V6:680–696.

Smith, J. A., et al. (1995) Directional surface wave estimates from Doppler sonar data. Journal of Atmospheric and Oceanic Technology V.12:617–632.

Stockhausen, W.T. (1994) Directional wave spectra using an acoustic doppler current profiler. A Thesis. Library of the Virginia Institute of Marine Science.

Takayama, T., et al. (1994) Development of a submerged Doppler–type directional wave meter. Coastal Engineering C.46:624–634.

Terray, E.A., et al. (1990) Measuring wave direction using upward–looking Doppler sonar. Proceedings of the IEEE Fourth Working Conference on Current Measurement 1–6 and Fig.1–Fig.4.

Terray, E., et al. (1997) Measuring wave height and direction using upward–looking ADCPs. IEEE Oceans '97 1–4.

Visbeck, M., et al. (1995) Sea surface conditions remotely sensed by upward–looking ADCPs. Journal of Atmospheric and Oceanic Technology V12:141–149.

Zedel, L. (1994) Deep ocean wave measurements using a vertically oriented sonar. Journal of Atmospheric and Oceanic Technology V.11:182–191.

* cited by examiner

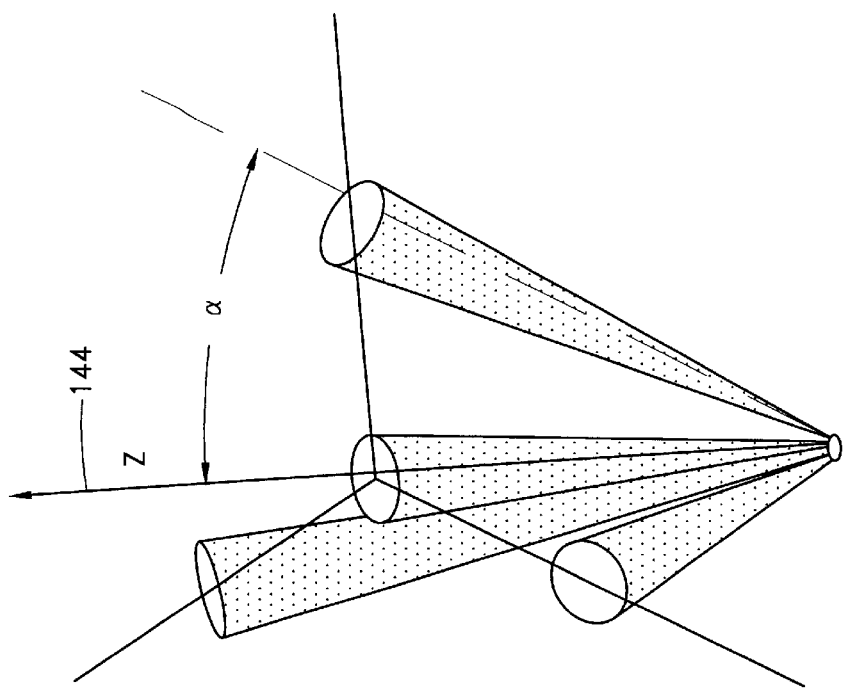
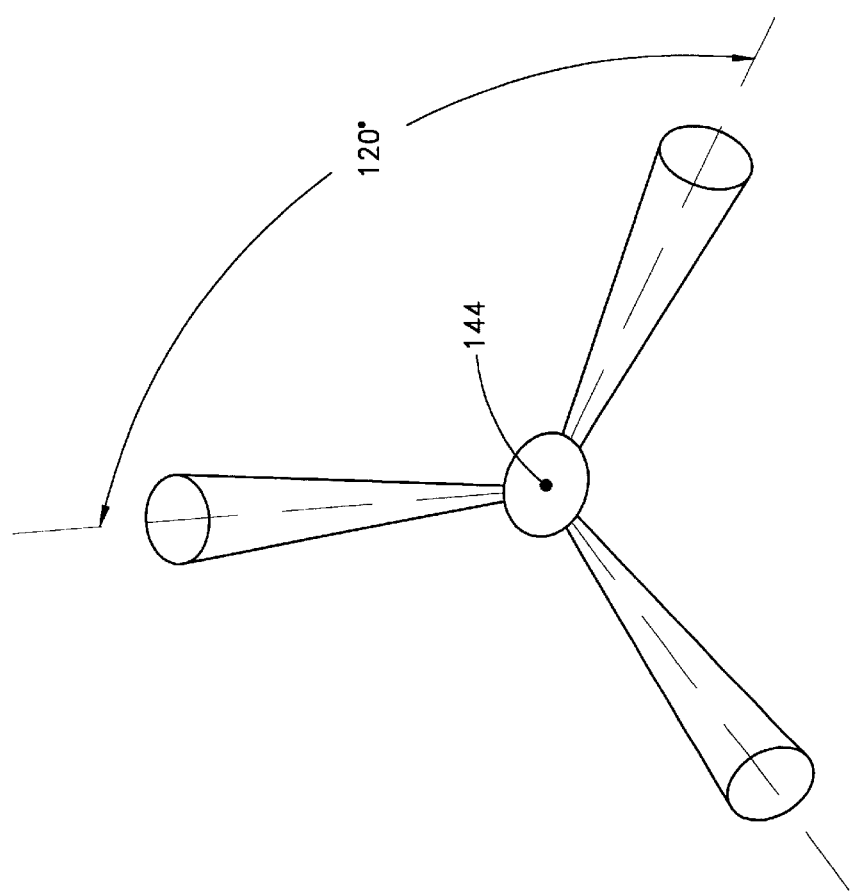
FIG. 3C

SYSTEM AND METHOD FOR MEASURING WAVE DIRECTIONAL SPECTRUM AND WAVE HEIGHT

This application is a cont. of Ser. No. 09/128,422 filed Aug. 4, 1998 U.S. Pat. No. 6,052,334.

BACKGROUND OF THE INVENTION

1. Field of the Invention

The present invention relates to underwater acoustic measurement systems and, more particularly, to acoustic Doppler current profilers used to measure wave directional spectra and surface wave height.

2. Description of the Related Technology

The use of Doppler sonar to measure currents in a fluid medium is well established. Conventional acoustic Doppler current profilers (ADCPs) typically use an array of acoustic transducers arranged in the well known Janus configuration. This configuration consists of four acoustic beams, paired in orthogonal planes. The ADCP measures the component of velocity projected along the beam axis, averaged over a range cell whose beam length is roughly half that of the emitted acoustic pulse. Since the mean current is assumed to be horizontally uniform over the beams, its components can be recovered simply by differencing opposing beams. This procedure is relatively insensitive to contamination by vertical currents and/or unknown instrument tilts.

The analysis of waves in a fluid medium is much more complicated, however. Although the wave field is statistically stationary and homogeneous, at any instant of time the wave velocity varies across the array and as a result it is not possible to separate the measured along-beam velocity into horizontal and vertical components on a sample-by-sample basis. If one sonar beam is vertical, then the frequency spectra in the can be separated, and a crude estimate of direction obtained from the ratio of horizontal velocity spectra But phase information is irrevocably lost through this procedure and the estimate is substantially biased when the waves are directionally spread. As a result, this estimator is not particularly useful, except perhaps in the case of swell. There is, however, phase information in the cross-correlations between the various range bins, and this fact allows the application of conventional signal processing techniques to estimate wave direction.

The wave directional spectrum (WDS) is a mathematical representation of the wave direction as a function of azimuth angle and wave frequency, which is useful in describing the physical behavior of waves within the fluid medium. The most common existing devices used to obtain wave directional spectra are 1) pitch, and roll buoys, and 2) PUV triplets, described in further detail below.

Pitch and roll buoys typically measure tilt in two directions as a surrogate for wave slope, along with the vertical component of acceleration. A recent variation uses GPS (Global Positioning System) measurements of three velocity components instead. The measured time series are Fourier transformed and the auto- and cross-spectra are formed, resulting in a cross-spectral matrix at each frequency. The elements of the cross-spectral matrix are directly related to the first five Fourier coefficients in direction (through $2\theta$) of the wave directional spectrum at each frequency (see Appendix A1). These buoys are typically used in deeper water. Unfortunately, the transfer functions for these buoys are complex, non-linear, and often difficult to determine. Additionally, the presence of a mooring line for the buoys adds additional complexity to the analysis due to added motion. Furthermore, such buoys are comparatively costly, vulnerable to weather and theft, and are not capable of measuring currents or wave heights.

PUV triplets (so named due to their measurement of pressure and both components of horizontal velocity, namely u and v) are basically single point electromagnetic current meters having an integral pressure transducer. Time series of pressure and horizontal velocity from PUV triplets are processed in a manner similar to the measurements made by pitch and roll and GPS buoys, also giving only the first five Fourier coefficients in direction at each frequency. PUV triplets are typically bottom mounted, and generally only useful in shallow water. This significant disability is due to the decrease in high frequency response resulting from the decay of wave velocity and pressure with increased water depth.

FIG. 1 illustrates a third and less common prior art technique for measuring wave directional spectrum employed by Krogstad, et al (see "High Resolution Directional Wave Spectra from Horizontally Mounted Acoustic Doppler Current Meters," Journal of Atmospheric and Oceanic Technology, Vol. 5, No. 4, August 1988) as part of the CUMEX (Current Measurement Experiment) program. This technique utilizes an acoustic Doppler sonar system having a transducer array mounted on an underwater structure. The array is configured with sets of horizontally oriented acoustic transducers which project two acoustic beams in a horizontal plane 90 degrees apart. Beam propagation is therefore essentially parallel to the surface of the water, and skims the surface of the water as the beam disperses. Such a surface skimming geometry provides a relatively dense and uniform set of time lagged echoes and therefore permits estimation of the joint frequency-wavenumber spectrum $S(f,k)$. See "Open Ocean Surface Wave Measurement Using Doppler Sonar," Pinkel, R and J. A. Smith, J. Geophys., Res. 92, 1987. Specifically, the directional spectrum $D(\theta)$ is expanded into a Fourier series, the coefficients of which are determined from the cross-spectral coefficient matrices generated from data obtained by the system. Since the acoustic beams are horizontal, no vector quantity (i.e., sensitivity vector) relating the beam geometry to the received current data is necessary. This technique is well suited to applications requiring only wave direction measurements and where a large, stable platform, such as a tower or large spar buoy, is available. However, there are a large number of applications, particularly in coastal oceanography and engineering, where it is desirable to know both the wave direction and vertical current profile, which the horizontal beam system can not provide. These applications include the analysis of sediment transport, atmosphere/sea interaction, pollutant dispersal, and hydrodynamic forces on off-shore structures. Additionally, it may be desirable in certain situations to simultaneously obtain wave height data along with the direction and current data. Due to the beam geometry, horizontal beam systems also are unable to measure current velocity above the wave troughs, which may be useful for studies of wave kinematics.

In summary, existing wave direction measurement techniques generally have several significant drawbacks (depending on type) including 1) inability to measure fluid current velocity and/or wave height along with WDS, 2) inability to readily measure wave directional spectrum at a broad range of depths; 3) inability to measure velocity profile above the wave troughs, 4) high degree of non-linearity; 5) high cost relative to the data obtained therefrom; and 6) susceptibility to damage/degradation from surface or near-surface influences.

Accordingly, a system and method for accurately measuring the wave directional spectrum and current profile in a broad range of water depths is needed by both commercial entities and researchers. Such a system and method would further allow the optional measurement of wave height in conjunction with WDS. Additionally, the system would be highly linear in response, physically compact and largely self-contained in design, and could be deployed in a number of different scenarios such as being bottom mounted, moored, or even mounted on a mobile submerged platform. The flexibility of configurations permits the user to have the maximum degree of operational flexibility and device longevity without significantly impacting performance or accuracy. Additional benefits of economy would be obtained through the use of commercially available off-the-shelf broadband or narrowband sonar equipment where practical.

SUMMARY OF THE INVENTION

The above-mentioned needs are satisfied by the present invention which includes a system and method for measuring the wave directional spectrum, current velocity within a given range cell or set of range cells, and wave height associated with a fluid medium by using acoustic signals. The present invention allows for accurate measurements of these parameters from fixed, moored, or mobile platforms using conventional Doppler sonar in conjunction with an upward and/or downward looking transducer array.

In a first aspect of the invention, there is an improved system for measuring the wave directional spectrum of a fluid medium. In one embodiment, a broadband acoustic Doppler current profiler (ADCP) is used in conjunction with an upward looking, bottom mounted multi-transducer (or phased) acoustic array to generate multiple acoustic beams, and sample a plurality of different range cells corresponding to different depths within those beams, in order to derive velocity and wave height data. Pressure readings are also optionally obtained from an associated pressure transducer located either on the ADCP or remotely thereto. This velocity, wave height, and pressure data is Fourier-transformed by one or more signal processors within the system (or in post-processing), and a surface height spectrum produced. A cross-spectral coefficient matrix at each observed frequency is also generated from this data. A sensitivity vector specifically related to the ADCP's specific array geometry is used in conjunction with maximum likelihood method (MLM), iterative maximum likelihood method (IMLM), iterative eigenvector (IEV), or other similar methods to solve the forward relation equation at each frequency and produce a wave directional spectrum. The ADCP may further be used to measure current velocity for various range cells in conjunction with the WDS and wave height measurements.

In a second embodiment of the wave direction measuring system of the present invention, the sonar system and acoustic array are mounted to a platform, such as a vessel hull, with the array positioned so as to generate a plurality of upward and/or downward-looking acoustic beams such that altitude and bottom velocity, along with mean current profile, can be measured.

In a second aspect of the invention, there is an improved algorithm and method of measuring the wave directional spectrum associated with a fluid medium. Specifically, a plurality of vertically oriented (possibly slanted) acoustic beams are generated using the system previously described. A plurality of different range cells within those beams are sampled to derive current velocity (and optionally, wave height) data Pressure readings are also optionally obtained from the associated pressure transducer. Initially, the sampled data is processed to remove data outliers and calculate mean values for current velocity, depth, and pressure. Intrinsic wave frequency (f) and wavenumber magnitude (k) are also calculated for each observed frequency component. Next, a non-directional surface height spectrum is calculated by computing the power spectra for the range cells of interest, and the transfer functions for the sensor array. A cross-spectral correlation matrix is then generated by selecting data from certain range cells, which may be the same or different from those selected for computing the power spectra above, applying a fast Fourier transform (FFT), cross multiplying all possible pairs of spectral coefficients for each observed frequency, and then averaging the results over time (from repeated Fourier transforms of sequential time segments) and/or over frequency (within bands of adjacent observed frequencies). After the cross-spectral matrix has been obtained, maximum likelihood, iterative maximum likelihood, and/or iterative eigenvector solution methods are applied to the array sensitivity vector, which is uniquely related to the chosen array geometry, and cross-spectral matrix to obtain a frequency specific wave directional spectra. Ultimately, the frequency-specific spectra are combined to construct a complete wave directional spectrum descriptive of both azimuth and frequency. The inventive algorithm can be run on existing signal processing equipment resident within the ADCP system, or run on an external computer as a post-processing task.

In a third aspect of the invention, there is an improved method of measuring the wave height spectrum of a fluid medium using a submerged sonar system. A broadband ADCP sonar system of the type described above is used in conjunction with an upward- or downward-looking transducer array in order to measure wave height using one or a combination of methods. The first method is to determine the slant range to the surface using the measured backscatter intensity and/or signal correlation to interpolate the location of the surface. The wave height spectrum is determined as the power spectrum of the surface elevation. The second method is to measure beam velocity data from selected range cells within the beams and use the relationship between the velocity spectrum and the wave height spectrum from linear wave theory to determine the latter. Alternatively, in a third method, pressure measurements obtained from the ADCP's pressure transducer may be used to calculate wave height.

These and other objects and features of the present invention will become more fully apparent from the following description and appended claims taken in conjunction with the accompanying drawings.

BRIEF DESCRIPTION OF THE DRAWINGS

FIG. 3c is an overhead and perspective view of an exemplary transducer array in the "star" configuration optionally used in conjunction with the present invention.

DETAILED DESCRIPTION OF THE PREFERRED EMBODIMENTS

Reference is now made to the drawings wherein like numerals refer to like parts throughout.

Figure 1:
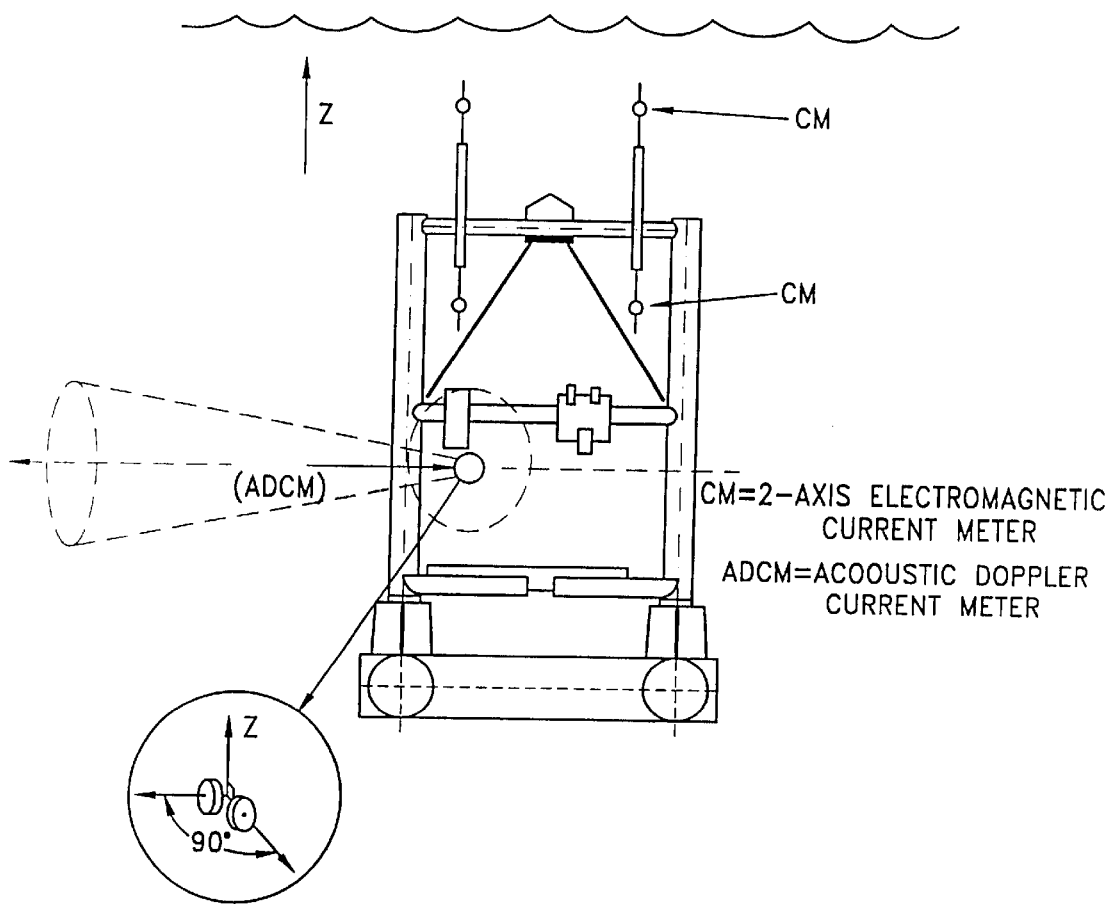
FIG. 1 illustrates a prior art wave directional spectrum measurement device utilizing two horizontal acoustic beams.
Figure 2A:
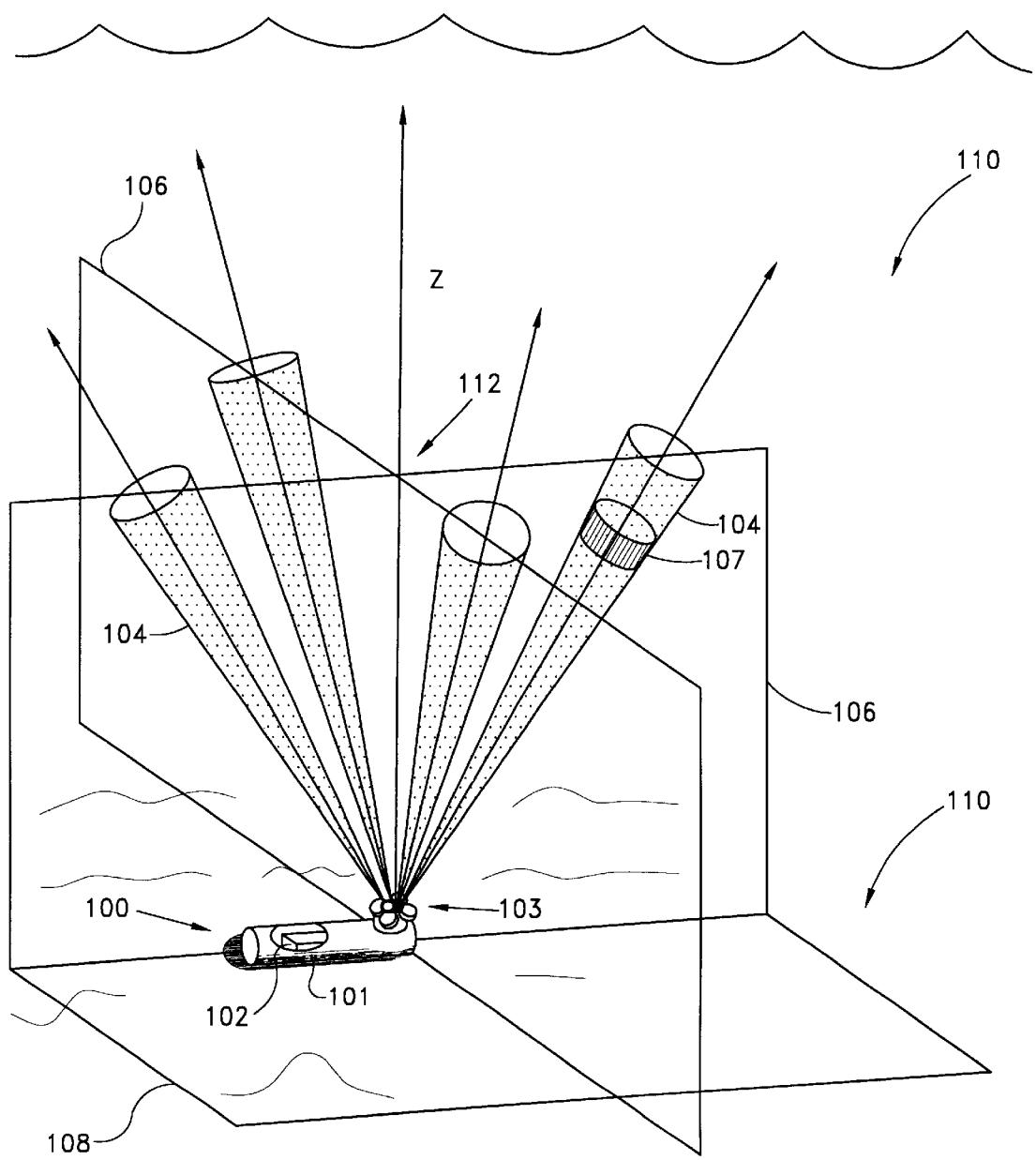
FIG. 2a is a perspective view of a first embodiment of an acoustic sonar system used for measuring wave directional spectrum, wave height, and current profile according to the present invention, the system being mounted to the bottom of the fluid medium volume.

FIG. 1 shows a transducer array for measuring wave height as is known in the technology. FIG. 2a illustrates a first exemplary embodiment of the WDS measurement system of the present invention. As shown in FIG. 2a, the system 100 is bottom-mounted and includes a body element 101 containing sonar electronics and processing equipment 102, and a multi-transducer array 103 having the individual transducer elements arranged in the Janus configuration (see discussion of FIGS. 3a and 3b below). This transducer array 103 generates acoustic beams 104 which are coplanar in the vertical plane 106 yet divergent from a horizontal plane 108 parallel to the surface of the fluid medium 110. The fluid medium 110 is most often natural or man-made bodies of water, especially the ocean. It should be noted that while the Janus array configuration is used in the embodiment of FIG. 2a, other array configurations which form beams having an angular relationship to the horizontal plane 108 may also be used. For example, a "pinwheel" array (e.g., one where the acoustic beams are skew-divergent from the longitudinal axis of the array), or "star" array (non-coplanar, non-skewed beams) may also be used. Additionally, phased or time-delayed arrays may be used in conjunction with the present invention. Note that the array sensitivity vector H, which is described in greater detail below, is unique to the specific array geometry employed, and accordingly is modified for use with such alternate array configurations.

Figure 2B:
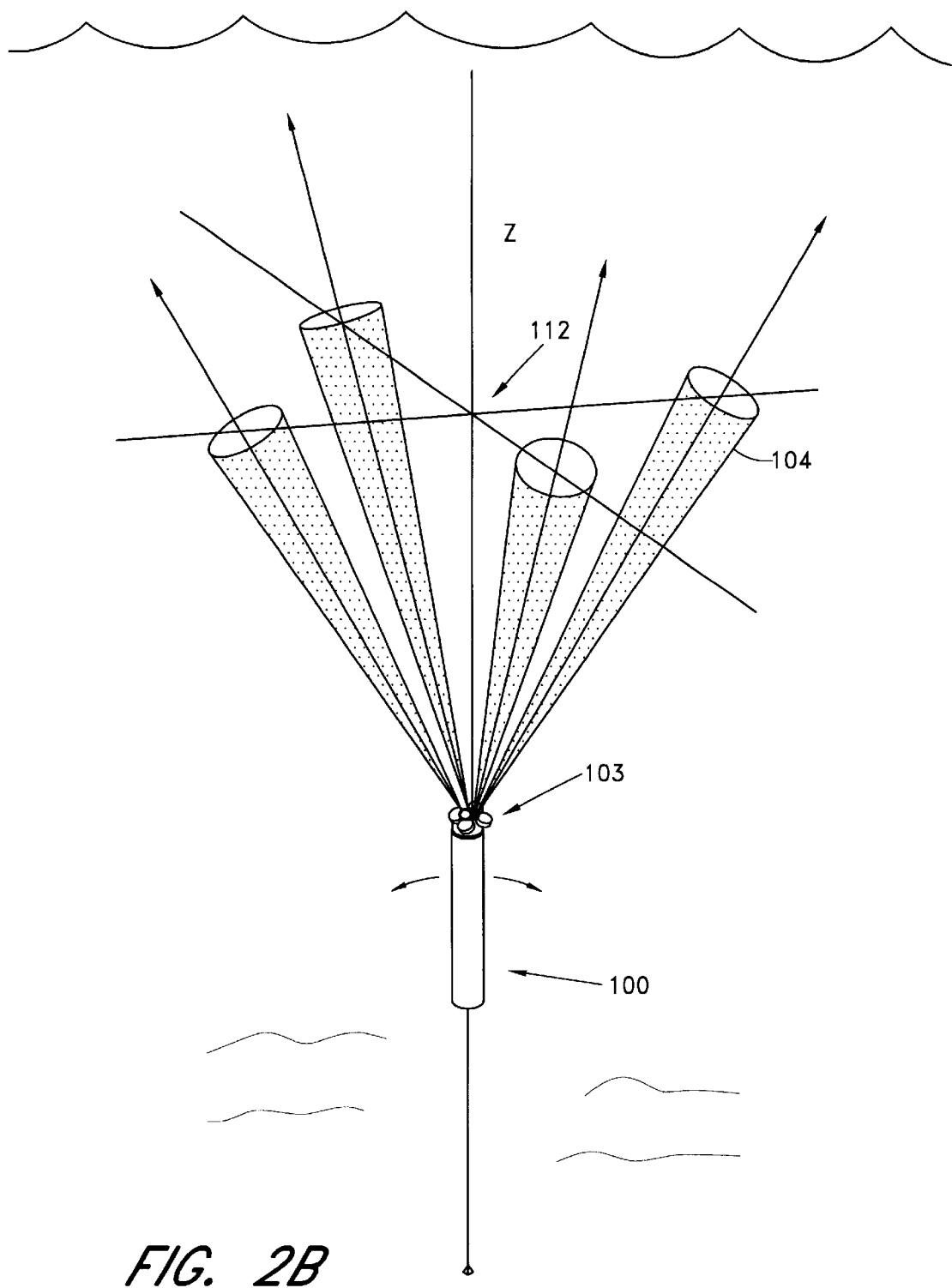
FIG. 2b is a perspective view of a second embodiment of an acoustic sonar system used for measuring wave directional spectrum, wave height, and current profile according to the present invention, the system being mounted to the bottom via a mooring line or tether.
Figure 2C:
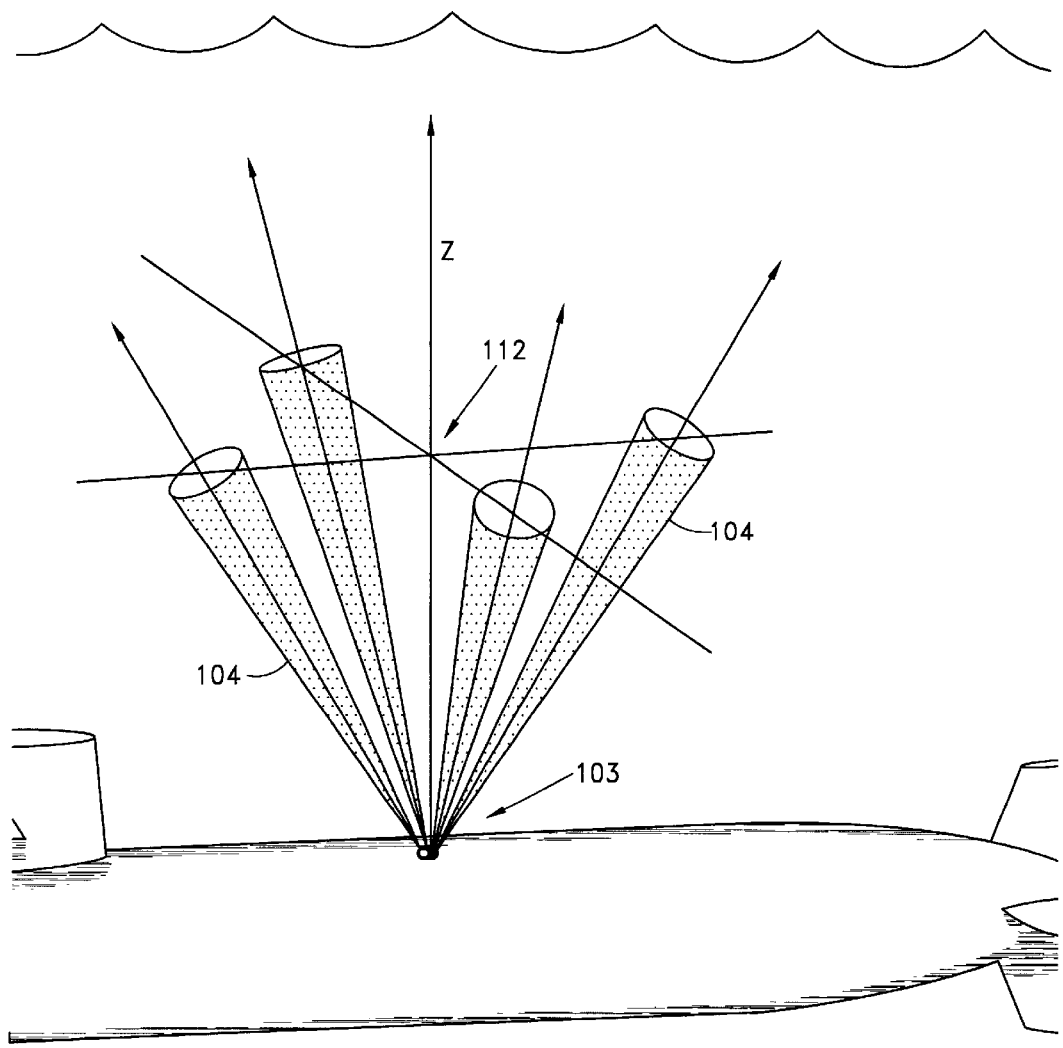
FIG. 2c is a perspective view of a third embodiment of an acoustic sonar system used for measuring wave directional spectrum, wave height, and current profile according to the present invention, the system being mounted on a submerged moving platform.

Referring again to FIG. 2a, the sonar system 100, including the transducer array 103, is mounted to the bottom 110 using any number of well known bottom mounting techniques including attachment to a heavy frame, trawl-resistant cage, or buried post. Alternatively, the system 100 can simply be laid on the bottom (or partially buried) in the desired orientation with no mounting hardware or attachment; a significant improvement over prior art systems which require a mooring line or platform. Since there is effectively no motion of the array within local spatial frame of reference 112 when the system 100 is bottom mounted, no errors resulting from the movement or rotation of the array 103 are generated, and hence the accuracy of the system is maximized. Additionally, bottom mounting places the system 100 away from the potentially damaging influences of surface craft, strong surface waves and current, and vandals. For these reasons, fixed mounting to the bottom 110 as depicted in FIG. 2a is the preferred method; however, the system 100 may alternatively be mounted via a mooring line (FIG. 2b), or on a moving underwater platform (FIG. 2c), and still produce useful WDS, current, and wave height data.

Figure 2D:
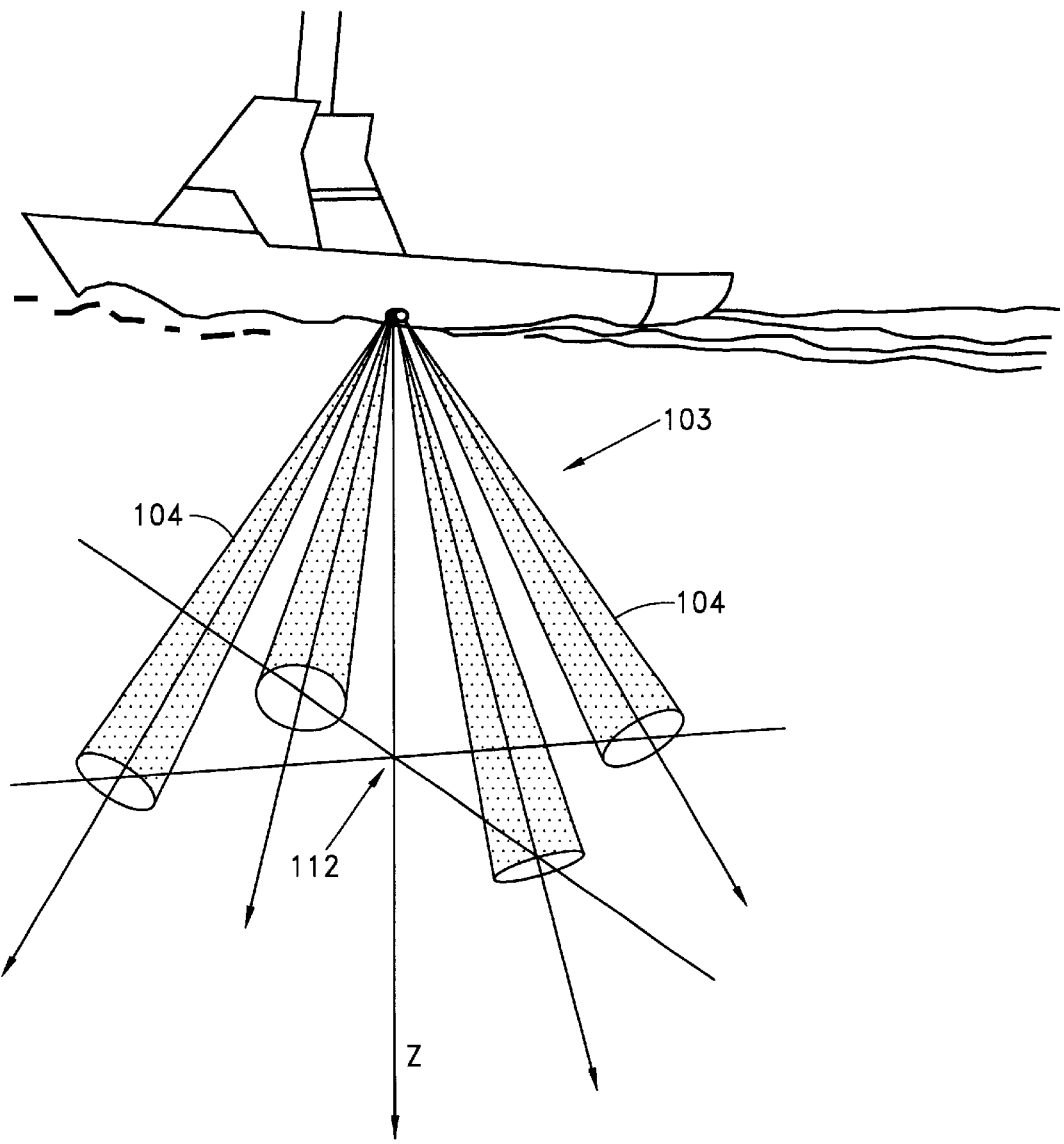
FIG. 2d is a perspective view of a fourth embodiment of a bottom mounted acoustic sonar system used for measuring wave directional spectrum, bottom velocity, and altitude according to the present invention, the system being mounted on a mobile surface platform in a downward-looking orientation.

As shown in FIG. 2d, the transducer array 103 may also be inverted for use with a surface or near-surface application, such as within the hull of a surface vessel 120, such that downward-projecting acoustic beams 104 are generated. In this way, WDS or current velocity at varying depths and at the bottom 110 of the fluid volume can be measured. Array altitude above the bottom (e.g., the height of the array above the local bottom), which may be different than water depth, can also be measured using this configuration.

Figure 3A:
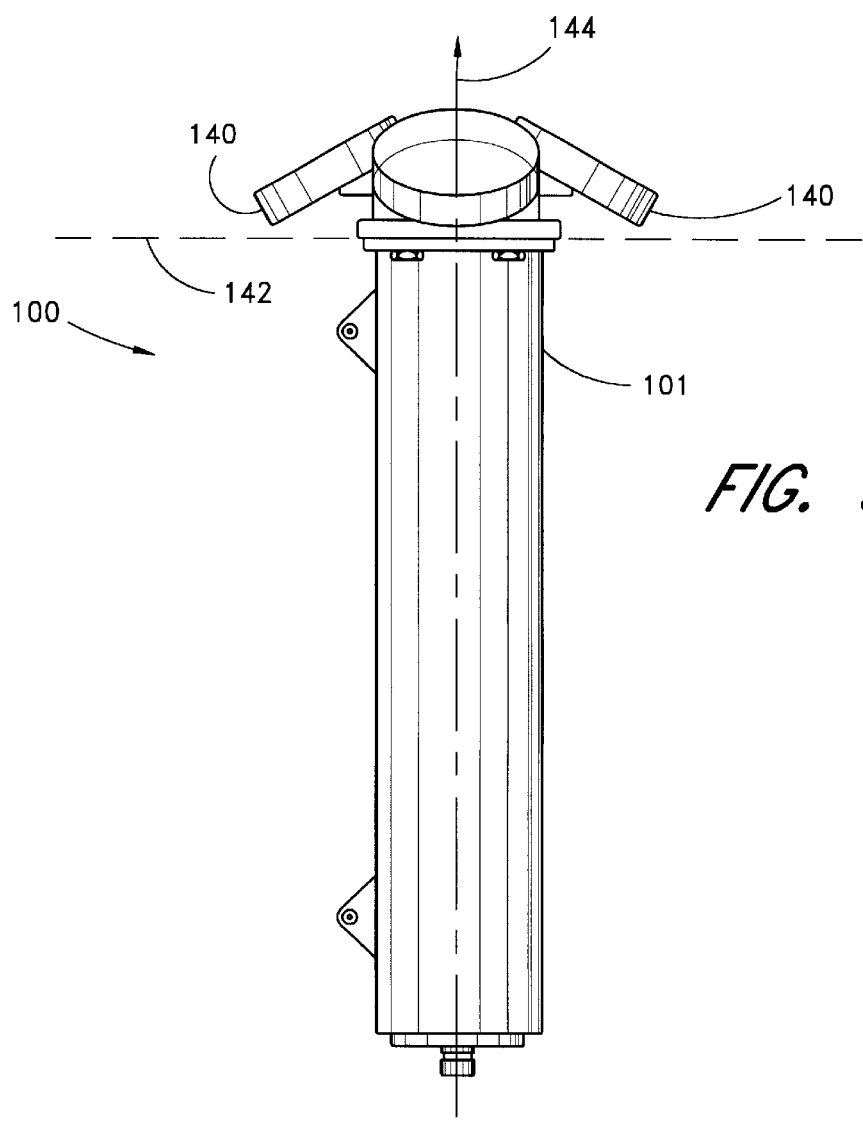
FIGS. 3a and 3b are side elevational and top plan views, respectively, of an exemplary current profiler transducer array in the Janus configuration used for performing wave directional spectrum and wave height measurements in accordance with the present invention.
Figure 3B:
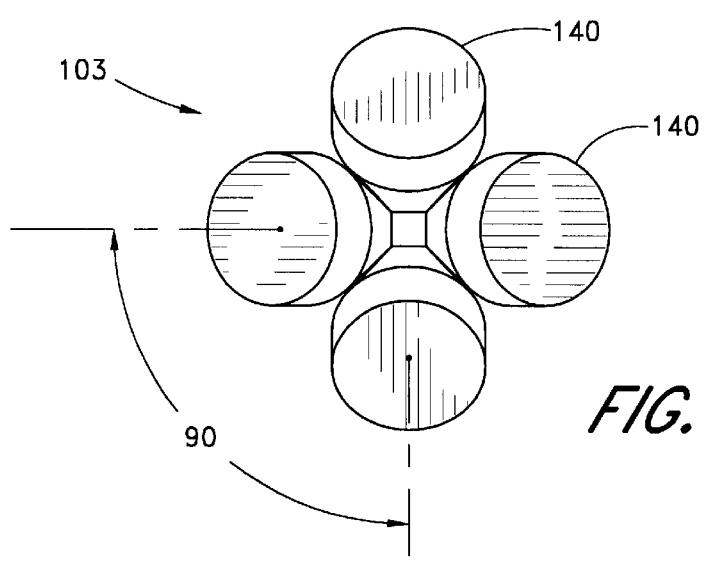

Referring now to FIGS. 3a and 3b, an exemplary transducer array configuration is shown. As previously discussed, the Janus configuration is preferred for use with the present invention, although other transducer configurations may be used. The Janus configuration utilizes transducer elements 140 which are spaced at 90 degree intervals in the azimuthal plane 142, and which are angled with respect to the longitudinal axis 144 of the array. The construction and operation of the Janus configuration array are well known in the sonar technology, and accordingly shall not be further described.

FIG. 3c illustrates a "star" (aka "bugeye") transducer configuration which can be used as an alternative to the Janus configuration previously described. As shown in the Figure, the star array generates four separate acoustic beams: three beams inclined with respect to the longitudinal axis 144 of the array and set at 120-degree intervals in azimuth, and a fourth beam centrally located and coincident with the longitudinal axis 144.

As is discussed in greater detail with respect to FIG. 5 below, an acoustic Doppler current profiler (ADCP) is the preferred sonar system used in the wave directional measurement system 100 of FIGS. 2a–2d. Unlike prior art WDS measurement systems which must be located within or close to the strata of the fluid medium being analyzed, the ADCP, using its upward-looking array, is capable of remotely sensing current velocity and wave height, thereby providing the WDS measurement system 100 with greater range capability as well as protection from surface and near-surface hazards.

Figure 4:
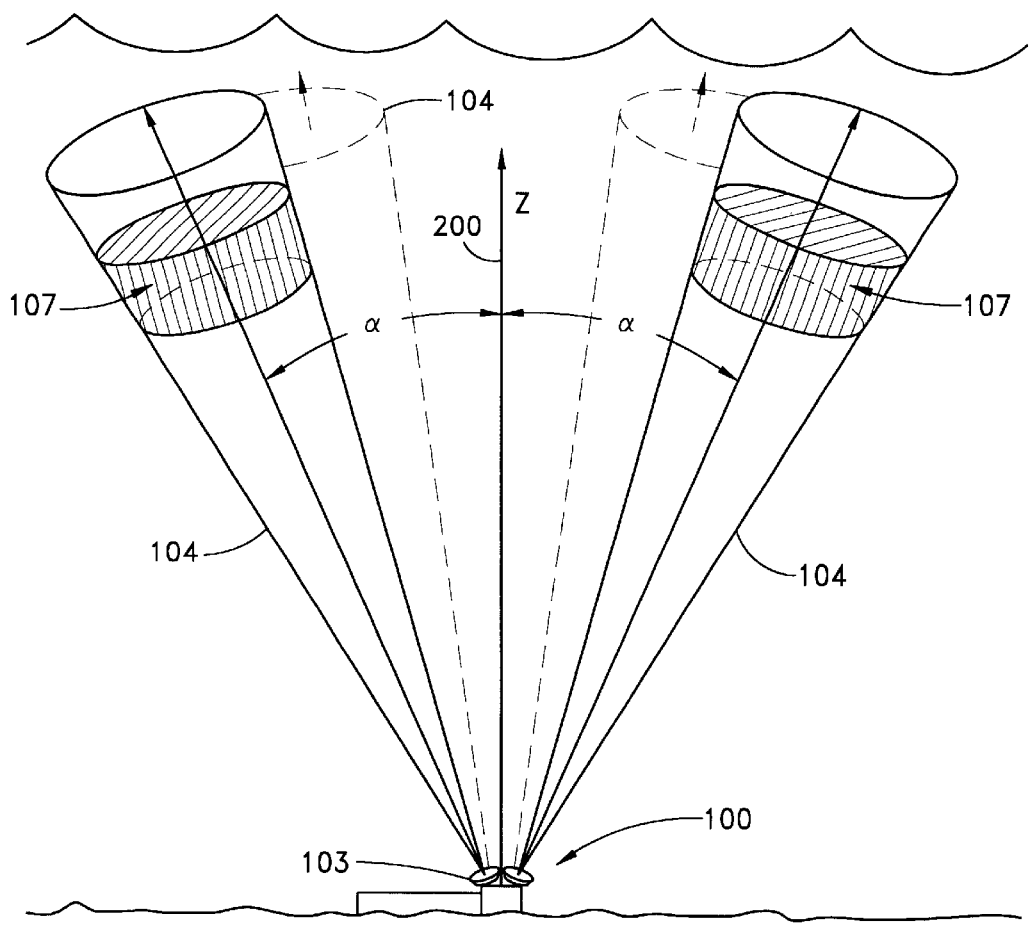
FIG. 4 is a side view of the bottom mounted sonar system of FIG. 2a illustrating the angular relationships of the acoustic beams to the surface of the fluid medium, and the relative position of range cells within the beams.

FIG. 4 is a side view of the bottom mounted sonar system 100 of FIG. 2a, including the transducer array of FIGS. 3a and 3b, illustrating the angular relationships of the acoustic beams 104 to the surface of the fluid medium, and the relative position of individual range cells within the beams. As shown in the Figure, the beams project upward from the transducer array 103 at an angle, typically between 20 and 30 degrees, although other values may be used, in relation to the vertical axis 200 of the local frame of reference 112. It is assumed for illustration that the longitudinal axis of the array 144 is coincident with the vertical axis 200 of the local frame of reference 112. However, it can be appreciated that the array 103 may be mounted at somewhat of an angle ("tilt") with respect to the vertical axis 200 depending on bottom type, contour, and other factors. Such a tilt is accounted for by selecting different range cells or bins within the various beams, and using the precise location of each range cell in the calculation of the sensitivity vector. Additionally, when the array 103 is mounted on a mooring line (as in FIG. 2b) or on a submerged moving platform (FIG. 2c), rotations off of the vertical axis 112 may be induced. Depending on the magnitude of the rotation, effects on the ultimate calculation of WDS, wave height, and current velocity within a given set of range cells may exist. Accordingly, a correction algorithm may be applied if desired to compensate for such movement.

Figure 5:
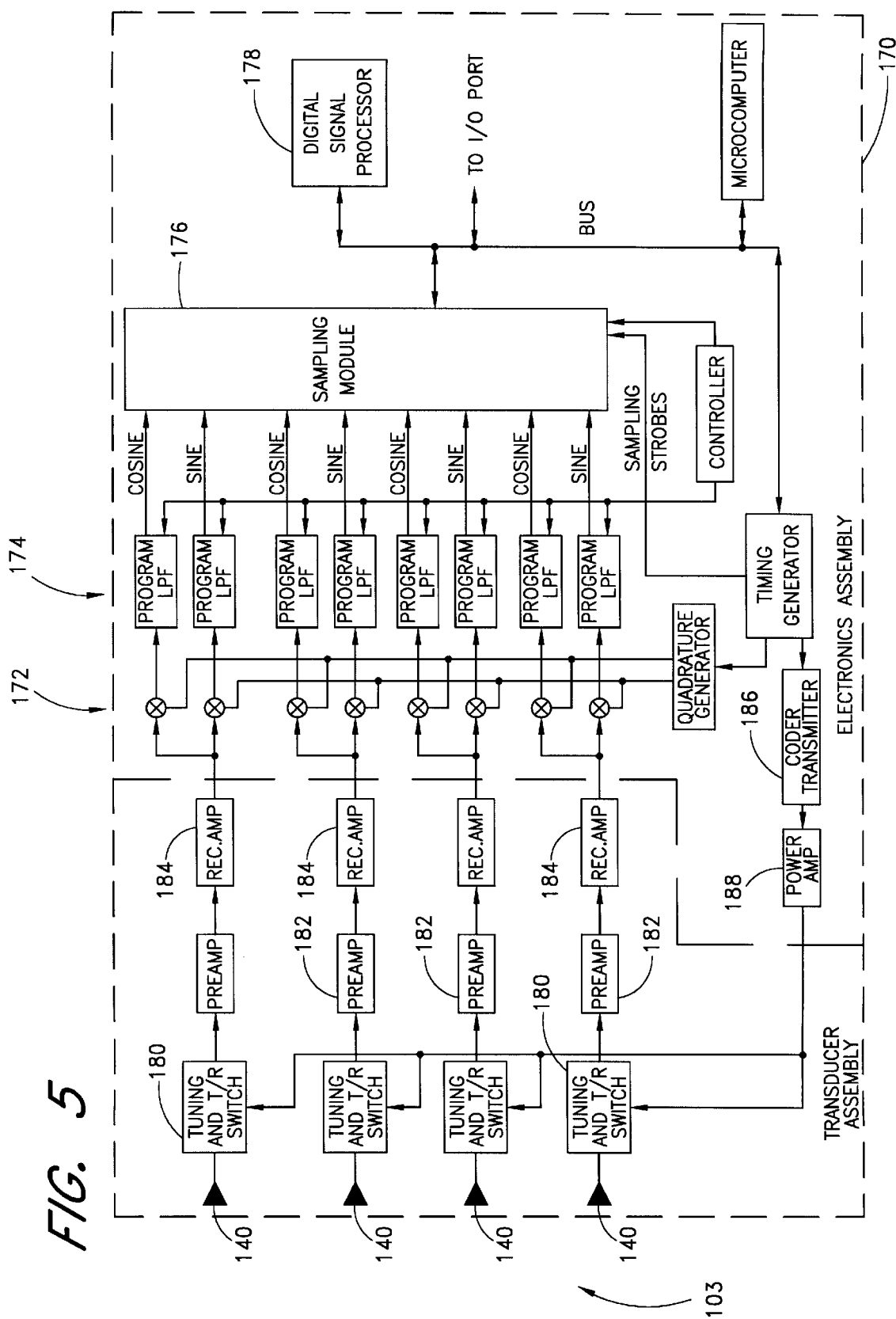
FIG. 5 is a block diagram of an exemplary embodiment of the electronics for a broadband acoustic Doppler current profiler (ADCP), which may be used in an embodiment of the present invention.

FIG. 5 illustrates an exemplary embodiment of the electronics for a broadband acoustic Doppler current profiler (ADCP) such as a Rowe-Deines Instruments Model BBADCP VM-150 used within the present invention. While the following discussion may refer to this ADCP system, it can be appreciated that other models and types of sonar systems, such as narrowband Doppler systems or non-Doppler-based systems, may be used with the present invention depending on the particular application and needs of the user.

Referring again to FIG. 5, the transducer array 103 is electrically connected to the electronics assembly 170 which includes a mixer network 172, low pass filter network 174, sampling module 176, and digital signal processor (DSP) 178. Signals generated by the transducer array elements 140 upon the receipt of acoustic signals are fed via the transmit/receive switches 180 to preamplifiers 182 and receiver amplifiers 184 which condition and amplify the signal(s) for further processing by the electronics assembly 170. A coder transmitter 186 and power amplifier 188 are used in conjunction with the DSP 178 to feed transmission signals to the transducer elements 140 via the transmit/receive switches 180. Thus, the same transducer elements are used for both transmit and receive functions. Additional details regarding the exemplary broadband ADCP system are contained in U.S. Pat. No. 5,208,785, "Broadband Acoustic Doppler Current Profiler" assigned to Rowe-Deines Instruments, Inc., which is incorporated herein by reference in its entirety.

It should be emphasized that the above-described system 100 utilizes a standard Rowe-Deines or other comparable ADCP, and requires no special hardware or modifications. This fact greatly increases the design and manufacturing economy of the present invention, and allows for easy retrofitting to existing ADCP systems. A pressure sensor is used to measure mean water depth (as well as optionally the wave height spectrum as discussed further below. However, such sensors are often available as options on commercial ADCP systems, or can be otherwise easily integrated into or mounted on the ADCP. Most any commercially available sensor adapted for underwater use, such as the Sensym Hastelloy C22 flush mount pressure sensor cell, can be used in this application.

Method and Algorithm for Estimating Wave Directional Spectrum and Wave Height

Each of the previously described hardware embodiments of the wave measurement system of the present invention utilize a specially designed algorithm to calculate WDS and wave height. This algorithm is ideally embodied in the form of software running on the existing signal processing capability of the ADCP (or other chosen sonar system), although it can be appreciated that the algorithm or components thereof could be embodied in firmware and/or hardware as well. The algorithm is based on a general method of calculating WDS which uses "sensor" data (e.g., current velocity, wave height, and/or pressure data) in conjunction with a sensitivity vector H, the latter being uniquely related to the chosen array geometry. The following discussion provides a theoretical overview of this method, followed by a detailed description of the operation of the algorithm used in conjunction with the preferred ADCP system described above. Appendix I provides additional detail on the derivation of the sensitivity vector H, cross-spectral matrix C, and wave directional spectrum $D(\theta,f)$.

Theoretical Overview

ADCP sonar systems measure, inter alia, the instantaneous current velocity component projected along the axis of each of its angled acoustic beams. The current can then be computed as the mean of the difference in velocities between opposing beams. Since successive positions along the angled beams correspond to different horizontal locations, the set of range cells within the beams constitutes a spatial array. Useful information regarding wave direction is contained in the current velocity cross-spectra (e.g., the array covariance matrix). Several other factors relating to the acoustic beam geometry must be considered, however.

First, the velocity signal-to-noise ratio (SNR) varies as a function of depth. At a given frequency, this change is due largely to the decay of wave velocity and pressure with depth. Hence, for the shorter waves, only range cells fairly close to the are of practical use.

Second, velocity measured by the sonar is a linear combination of both vertical and horizontal wave velocities, the relative weighting therebetween being a function of both wave direction and water depth. A mathematical relationship connecting the along-beam component of wave velocity and surface elevation is needed.

For practical purposes, a random wave field can be treated as if it were a linear superposition of infinitesimal uniform plane waves, each with a particular directional orientation, frequency, and wavenumber. Neglecting non-linear effects, the dispersion relation is used to constrain these plane waves to a set that satisfies the linear dispersion relation connecting frequency and wavenumber. When there is no mean current, the linear dispersion relation for an infinitesimal plane wave is:

$$f = \frac{1}{2\pi}\sqrt{gk\tanh(kh)} \qquad \text{Eqn. 1}$$

where f is the wave frequency (Hertz), g is the gravitational acceleration constant (about 9.8 m/s$^2$, h is the water depth (meters), k=2π/L is the wavenumber magnitude (radians per meter), and L is the wavelength (meters), Allowing for a steady uniform current $u_c$ and assuming an observation platform fixed to the bottom, the linear dispersion relation has the somewhat modified form:

$$f_{obs} = f + \frac{1}{2\pi}u_c \cdot k \qquad \text{Eqn. 2}$$
$$= \frac{1}{2\pi}\left[\sqrt{gk\tanh(kh)} - u_c k\cos(\beta - \theta)\right]$$

where $f_{obs}$ is the observed wave frequency (Hz), f is the intrinsic wave frequency that would be observed in a reference frame moving with the current (from Eqn. 1), k is the wavenumber vector perpendicular to the wave crests (radians/m), pointed in the direction the wave moves relative to the water, β is the azimuth angle of the direction the current is moving toward, θ is the azimuth angle opposite to the direction of the wavenumber vector k, (the direction the waves are coming from relative to the water), $u_c$ is the current vector, and $u_c=|u_c|$ is the current speed (m/s). Note that velocity contributions of order (ak)$^2$ and higher are neglected, where a is a measure of wave amplitude (e.g. ak is proportional to wave slope). Terms of order (ak)$^2$ in the dispersion relation are also discarded. Since the waves of interest are those near the spectral peak, which conservatively have slopes less than 0.1, these corrections are less than 1%.

If the current is not uniform with elevation, the appropriate value of $u_c$ to use at each intrinsic frequency is the weighted-average velocity profile, using a normalized weighting function proportional to the square of the horizontal wave orbital velocity:

$$u_c = \frac{\int_{-h}^{0}[f\cosh[k(h+z)]/\sinh(kh)]^2\langle u(z)\rangle\,dz}{\int_{-h}^{0}[f\cosh[k(h+z)]/\sinh(kh)]^2\,dz} \qquad \text{Eqn. 3}$$

where <u(z)> is the time-averaged horizontal current profile.

For the wave directional spectrum, the usual convention is to use the linear dispersion relation to eliminate the magnitude k of the wavenumber as an independent variable.

The wave directional spectrum D(θ,f) therefore represents the power spectral density of the infinitesimal plane waves in the two-dimensional azimuth-frequency space.

In general, an instrument for measuring the wave directional spectrum can make use of a combination of velocity, pressure, and/or surface elevation measurements at a single point ("triplet") or at an array of points at or below the water surface. Linear wave theory can be used to relate the directional wave spectrum D(θ,f) to these measurements. The Fourier transforms of measurement time series can be cross-multiplied to form cross spectral coefficients, which can be arranged in a cross-spectral coefficient matrix C at each observed frequency. The so-called "forward relation" is a theoretical model connecting the unknown wave direction spectrum D(θ,f) with the observable array covariance matrix C($f_{obs}$) (the matrix of velocity cross-spectra between the various sonar range cells). The forward relation takes the following form:

$$C(f_{obs}) = \int_{-\pi}^{+\pi} H(\theta, f_{obs})D(\theta, f)H^\dagger(\theta, f_{obs})J\,d\theta \qquad \text{Eqn. 4}$$

where $f_{obs}=f_{obs}(f)$ is the mapping given by Eqn. 2,

H is the sensitivity vector (known from linear wave theory),

H$^\dagger$ is the complex conjugate transpose (Hermitian) of H, $$J = \left|\frac{\partial f}{\partial f_{obs}}\right|_\theta = \left[1 - \frac{u_c\cos(\beta-\theta)}{c_g}\right]^{-1} \text{ is the Jacobian,} \qquad \text{Eqn. 5}$$

$$c_g = \frac{d(2\pi f)}{dk} \qquad \text{Eqn. 6}$$
$$= \frac{1}{2}c_{ph}\left[1 + \frac{2kh}{\sinh(2kh)}\right] \text{ is the group velocity, and}$$

$$c_{ph} = \frac{2\pi f}{k} = \sqrt{\frac{g}{k}\tanh(kh)} \text{ is the phase velocity} \qquad \text{Eqn. 7}$$

Note that the form of the sensitivity vector H is related to the geometry of the array formed by range cells selected from those in the ADCP beams. Each selected range cell from a particular beam and depth corresponds to an element of H. The sensitivity vector H may also optionally contain elements corresponding to surface elevation measured acoustically at each beam, and/or a pressure measurement.

Note also that when there is a current, there may be more than one f that maps to each $f_{obs}$, in which case C is the sum of such mappings. Since negating the frequency is equivalent to reversing the direction o the wavenumber, θ should be replaced with θ+π when $f_{obs}$ is negative due to strong current.

Again, the forward relation (Eqn. 4) applies to any array or triplet that measures wave directional spectra The inversion of the forward relation to determine wave directional spectrum from measured cross-spectral matrix C presents significant complexities in that an infinite-dimensional object (D) is to be estimated using a set of finite-dimensional observations (C). Hence, the problem is severely underconstrained and no unique solution exists. A number of different solution techniques have been developed to address the inversion problem. Of most use to the present invention are the so-called maximum likelihood method (MLM) and iterative maximum likelihood method (IMLM), the general application and operation of which are well known in the signal processing arts. See Appendix I for a more detailed discussion of the theoretical foundation for these techniques. It should be noted that while the present invention is described in terms of the MLM and IMLM techniques, other techniques such as the iterative eigenvector (IEV) method, may be applied depending on the particular application.

Description of WDS Algorithm

Figure 6:
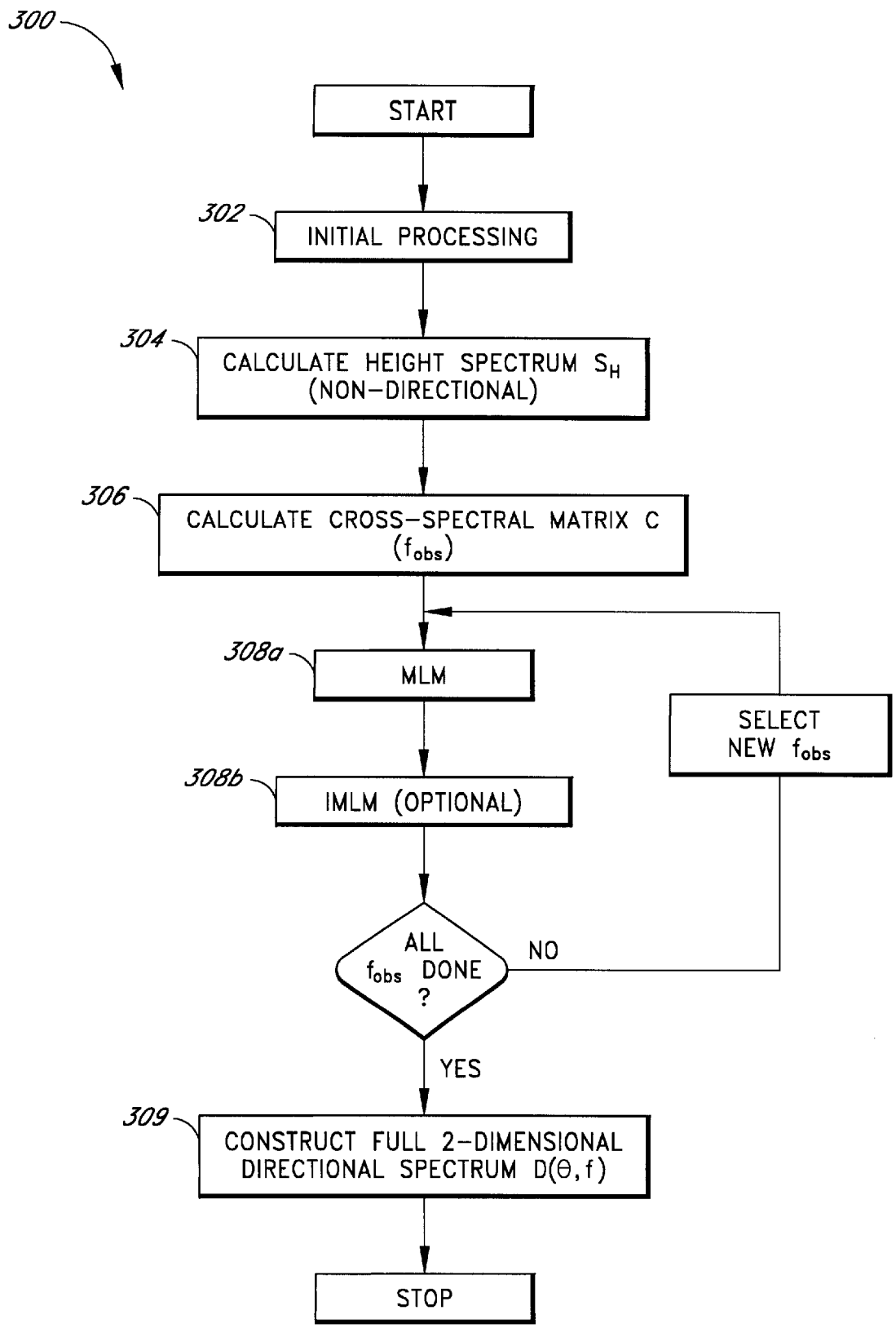
FIG. 6 is a flow diagram illustrating the general method of determining wave directional spectrum according to one aspect of the present invention.

Referring now to FIG. 6, the algorithm for determining the wave directional spectrum according to the present invention is described. In the present embodiment, the algorithm 300 consists of the following general steps: 1) conducting initial data processing 302; 2) calculating a non-directional wave height spectrum 304; 3) calculating a cross-spectral matrix C for each observed frequency 306; 4) estimating the wave directional spectrum (for each observed frequency) 308a, 308b; and 5) constructing a complete two-dimensional wave directional spectrum from the estimates derived in Step 4) 309. Each of these steps is described in detail below, with reference to FIGS. 6a–6f, respectively. It should be noted that the individual steps 302, 304, 306, 308a, 308b, 309 of the algorithm 300 (and their sub-steps) may be permuted under certain circumstances. Furthermore, while specific computations are described, it can be appreciated that other mathematical approaches or techniques may be substituted.

Figure 6A:
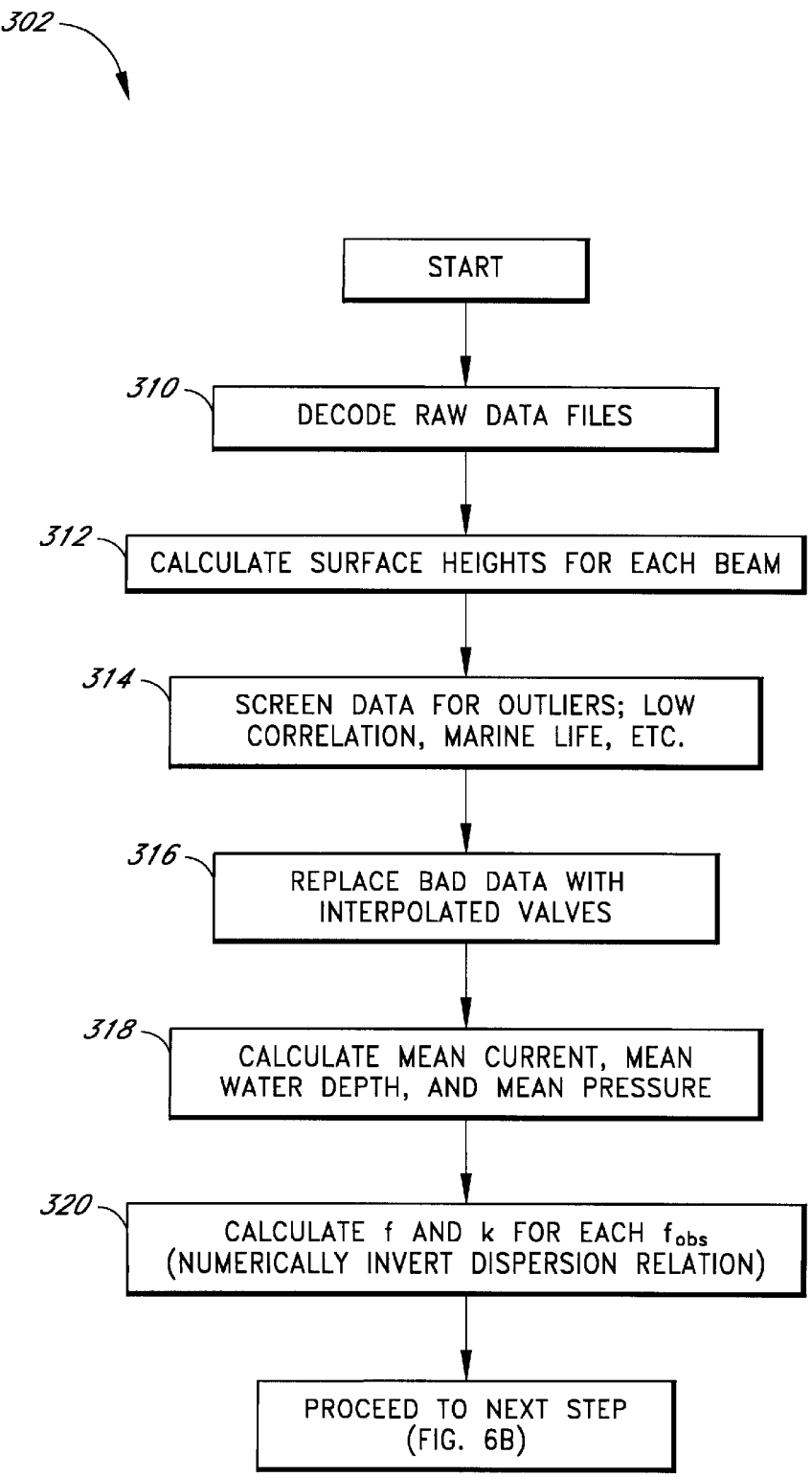
FIG. 6a is a flow diagram illustrating one exemplary embodiment of the initial data processing function of the method of FIG. 6.

As shown in FIG. 6a, the initial processing step 302 of the algorithm 300 includes a series of sub-steps 310, 312, 314, 316, 318, 320 which collectively prepare the raw data obtained from the sensors for further processing. In the first sub-step 310 of algorithm step 302, raw data obtained from the sensors is decoded using any number of decoding algorithms known in the prior art. In the second sub-step 312, the surface height for each acoustic beam is calculated. This is accomplished using the interpolated peak location in the acoustic backscatter intensity, as described in "Measuring Wave Height and Direction Using Upward-Looking ADCPs", Terray, E., et al, IEEE Oceans 1997, August, 1997, which is incorporated herein by reference in its entirety, although other methods may be used. The third sub-step 314 involves processing the decoded raw data to identify "outliers," data having a poor correlation, or data associated with other anomalies present in the fluid medium (such as marine life). Next, in the fourth sub-step 316, "bad" data identified in sub-step 314 is replaced with data derived by interpolating between "good" data values. Mean values of current velocity (and optionally water depth and pressure) are then calculated in sub-step 318 from the processed data resulting from the data replacement process 316. Finally, in the last sub-step 320, values of wave frequency (f) and wave number magnitude (k) are calculated using numerical inversion of the linear dispersion relation (see eqn. 2 above, which is discussed in additional detail in Appendix I).

Figure 6B:
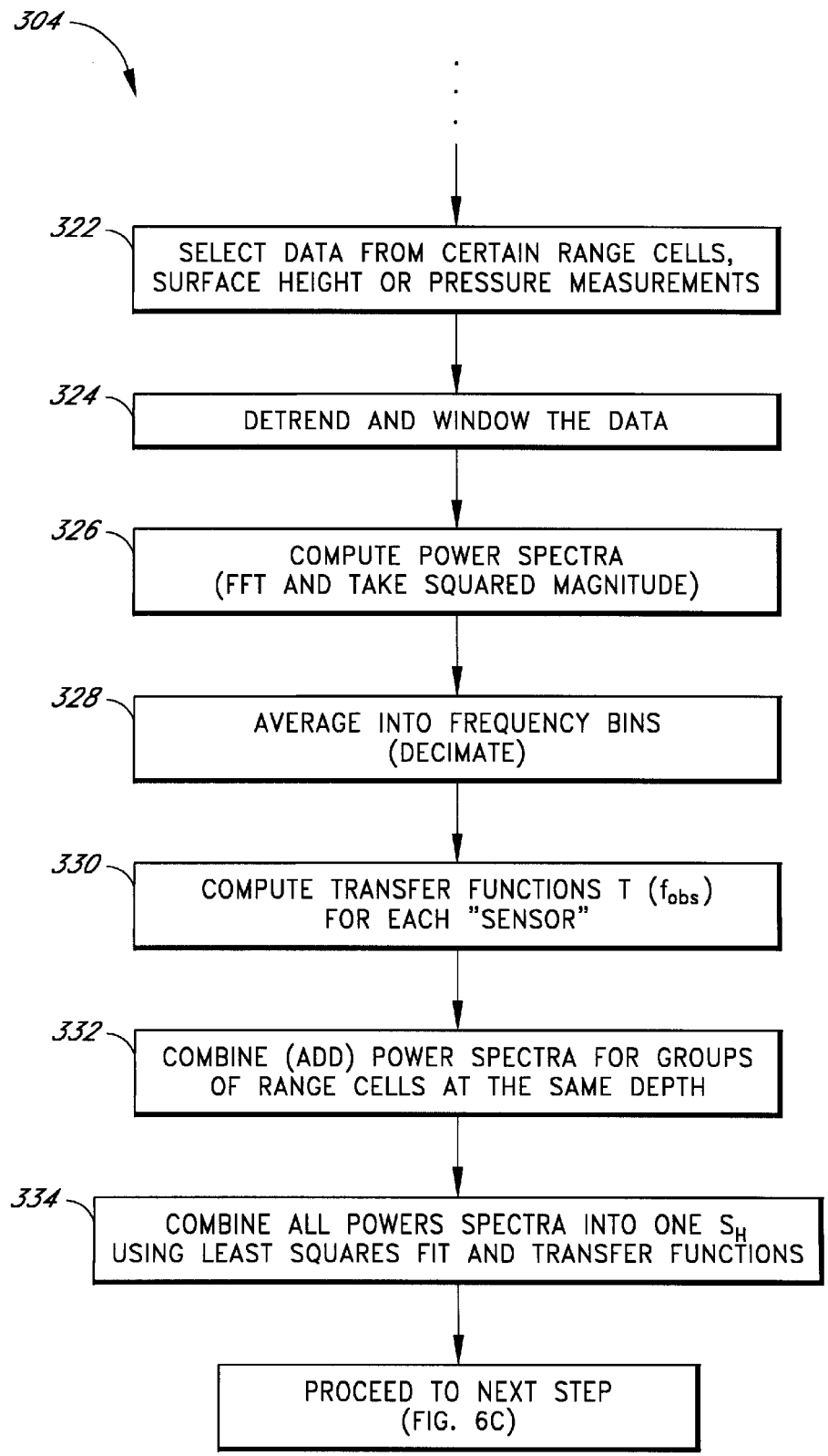
FIG. 6b is a flow diagram illustrating one exemplary embodiment of the wave height spectrum calculation function of the method of FIG. 6.

As shown in FIG. 6b, the step of calculating the wave height spectrum $S_H$ 304 in FIG. 6 includes a series of sub-steps 322, 324, 326, 328, 330, 332, 334 which collectively calculate $S_H$ from the data initially processed in the first algorithm step 302. In the first sub-step 322 of algorithm step 304, velocity data is selected from certain range cells within the acoustic beams 104. Using the apparatus of FIG. 2a above, these range cells are selected primarily on their proximity to the surface of the fluid medium (so as to reduce the effects of wave velocity and pressure decay with depth, as previously described), although other cells may be chosen. Optionally, surface height and pressure data is also selected. It should be emphasized that while the present algorithm 300 has the capability to incorporate wave height and pressure measurements within the sensitivity vector H (see discussion of FIG. 6d below), such measurement are not required to calculate the WDS. The use of such measurements do, however, generally increase the relative accuracy of the estimate provided by the system.

In the second sub-step 324 of FIG. 6b, the selected velocity, surface height, and pressure data is detrended by subtraction of a trendline determined by least-squares fit and windowed by multiplication by a window function of time such as a Bartlett window, for the purpose of reducing spectral leakage. The third sub-step 326 computes a power spectrum for each set of data by performing a fast Fourier transform (FFT) and squaring the magnitude of the result, although other methods may be used. Next, in the fourth sub-step 328, the power spectra are averaged into frequency bins (so-called "decimation"). Transfer functions $T(f_{obs})=|H|^{-2}$ are then computed for each "sensor" in sub-step 330 using Eqns. 16 and 17 below. It should be noted that the term "sensor" in the present context refers to either 1) current velocities obtained from the range cells of the acoustic beams at the same water depth; 2) the surface height measurement obtained for each acoustic beam (see calculation of surface height sub-step 312 above), or 3) the pressure sensor. Combinations of these sensors may also be used to calculate the wave height spectrum.

In the sixth sub-step 332 of FIG. 6b, power spectra for groups of range cells at the same depth are combined by adding the power spectral coefficients. Finally, in the last sub-step 334, all power spectra previously calculated are combined into one wave height spectrum $S_H$ using, for example, a least squares fit technique and the transfer functions $T(f_{obs})$.

Figure 6C:
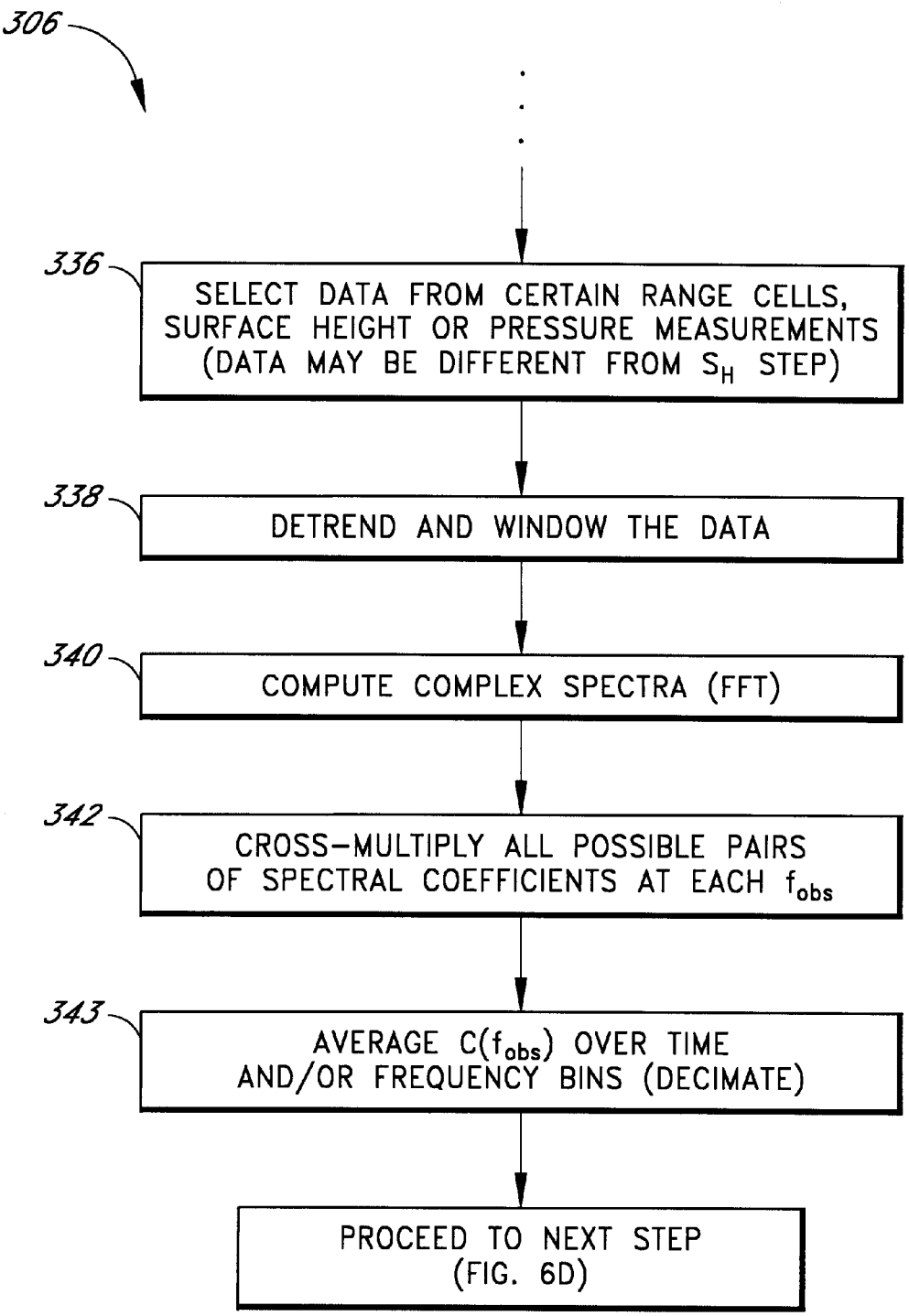
FIG. 6c is a flow diagram illustrating one exemplary embodiment of the cross-spectral coefficient matrix calculation function of the method of FIG. 6.

Referring now to FIG. 6c, the method of calculating of the cross-spectral matrix is described in detail. As in the calculation of $S_H$ described above (FIG. 6b), data from specific range cells, surface height data, or pressure sensor data are selected in the first sub-step 336. Note, however, that the data selected in this sub-step 336 may be the same or different from that selected as part of the calculation of $S_H$ 322. Smaller range cells may be needed to resolve the direction of the shorter waves, while range cells may be combined into larger ones (by averaging velocity measurements) to reduce the noise level for computing the wave height spectrum.

Again, the selected data is detrended and windowed (sub-step 338). After windowing and detrending, complex spectra are computed (using FFT or another comparable technique) 340. Next, all possible pairs of spectral coefficients for each observed frequency ($f_{obs}$) are cross-multiplied 342. In order to perform this cross-multiplication sub-step 342, one spectral coefficient from each pair is first complex-conjugated. Lastly, the cross-spectral matrices for each observed frequency are averaged over time (and/or within frequency bands) to produce the cross-spectral matrix as a function of observed frequency 343.

Figure 6D:
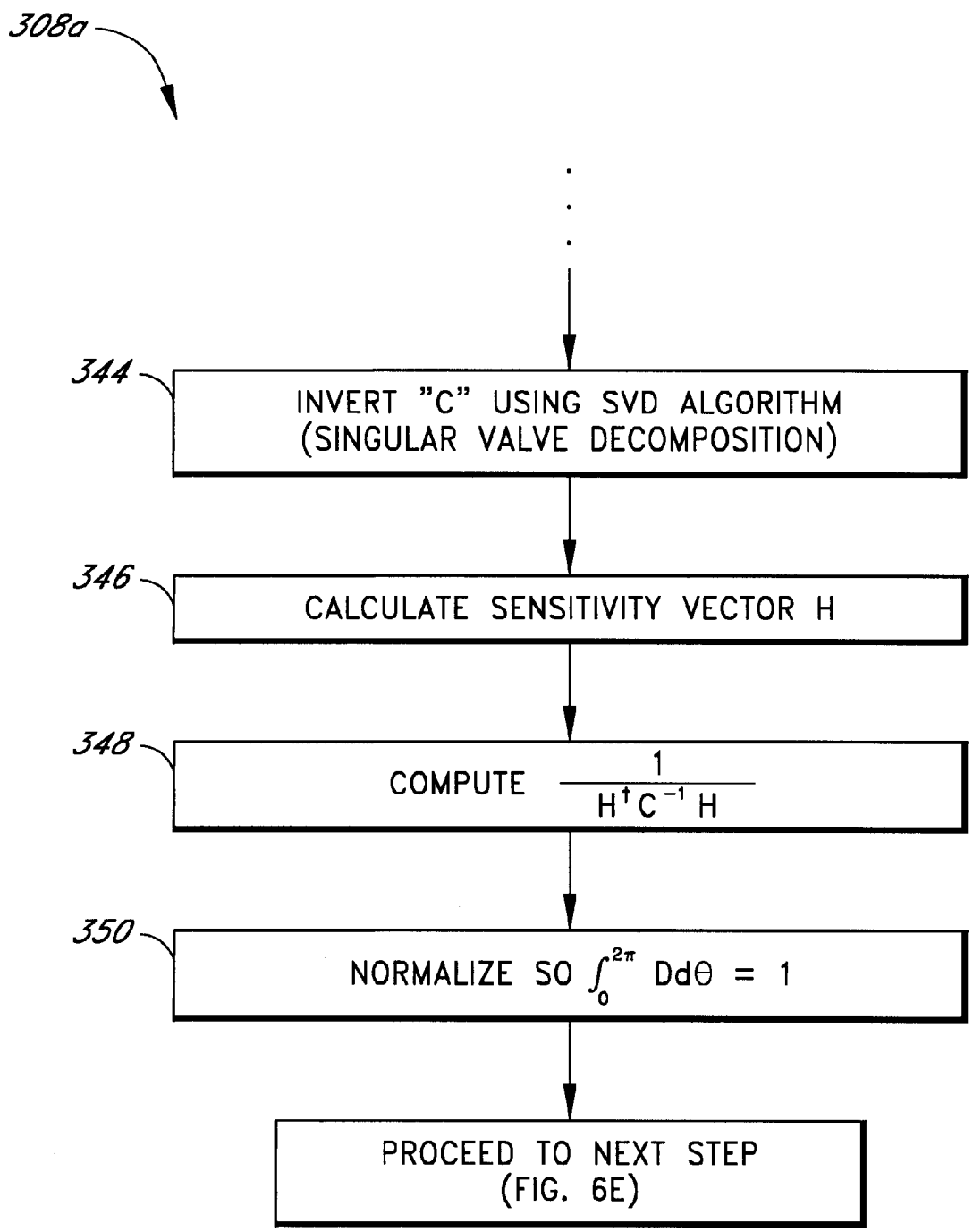
FIG. 6d is a flow diagram illustrating one exemplary embodiment of the maximum likelihood method (MLM) calculation function of the method of FIG. 6.

Referring now to FIG. 6d, the maximum likelihood method (MLM) step 308a of FIG. 6 is described in detail. As previously described, the MLM is one algorithm available for solving the so-called "forward relation" which relates the wave directional spectrum D (θ,f) with the observable cross-spectral matrix $C(f_{obs})$.

As shown in FIG. 6d, the first sub-step 344 of the MLM is to invert the cross-spectral coefficient matrix C for each observed frequency using a singular value decomposition (SVD) technique. SVD techniques are well known to those skilled in the signal processing arts, and accordingly will not be discussed in further detail herein.

Next, the array-specific sensitivity vector H is calculated 346. Each selected range cell from a particular acoustic beam and depth corresponds to an element of H. Note that H may also contain elements corresponding to optional surface height and pressure measurements. The sensitivity vector H represents the ideal measured response to a plane wave, assuming linear theory and the linear dispersion relation (see previous discussion), and neglecting instrument noise. The linear wave model predicts:

$$\eta(x,t) = a\cos(k \cdot (x - u_c t) - 2\pi f t) = a\cos(k \cdot x - 2\pi f_{obs} t) \quad \text{Eqn. 8}$$

$$p(x, z, t) = \rho g a \frac{\cosh[k(h+z)]}{\cosh(kh)} \cos(k \cdot x - 2\pi f_{obs} t) - \rho g z \quad \text{Eqn. 9}$$

$$u(x, z, t) = a(2\pi f) \frac{\cosh[k(h+z)]}{\sinh(kh)} \cos(k \cdot x - 2\pi f_{obs} t) \left(\frac{k}{k}\right) + u_c \quad \text{Eqn. 10}$$

$$w(x, z, t) = a(2\pi f) \frac{\sinh[k(h+z)]}{\sinh(kh)} \sin(k \cdot x - 2\pi f_{obs} t) \quad \text{Eqn. 11}$$

where $\eta$ is the surface elevation (m), p is the pressure (Pascal), $\rho$ is the water density (kg/m$^3$), g is the gravitational acceleration (m/s$^2$), u is the horizontal velocity vector (m/s), w is the vertical velocity component (m/s), a is the half-amplitude of the plane wave (m), h is the water depth (m), x is the horizontal position vector, and z is the vertical position (-h at the bottom, o at the surface) (m).

The Fourier transforms in time of the above sine waves are delta function line spectra, the areas under which are the respective Fourier coefficients (indicated by tildas):

$$\tilde{\eta}(x, f_{obs}) = \frac{1}{2} a \exp(i k \cdot x) \quad \text{Eqn. 12}$$

$$\tilde{p}(x, z, f_{obs}) = \frac{1}{2} \rho g a \frac{\cosh[k(h+z)]}{\cosh(kh)} \exp(i k \cdot x) \quad \text{Eqn. 13}$$

$$\tilde{u}(x, z, f_{obs}) = \frac{1}{2} a(2\pi f) \frac{\cosh[k(h+z)]}{\sinh(kh)} \exp(i k \cdot x) \left(\frac{k}{k}\right) \quad \text{Eqn. 14}$$

$$\tilde{w}(x, z, f_{obs}) = -\frac{1}{2} i a(2\pi f) \frac{\sinh[k(h+z)]}{\sinh(kh)} \exp(i k \cdot x) \quad \text{Eqn. 15}$$

Note that the Fourier coefficient of the surface displacement at x=0 is simply a/2, regardless of the direction or frequency of the plane wave. The squared magnitude of this coefficient is the non-directional power spectrum of the wave height. Therefore the Fourier coefficients of the various measurements are scaled by 2/a to represent the response to a plane wave of unit spectral density.

For velocity measurements, each element of H is computed as the scaled Fourier coefficient corresponding to component of the velocity in the direction of the beam at the location of the range cell:

$$H(z, x_n) = \frac{2}{a} [\tilde{u} + \tilde{w} \hat{i}_z] \cdot b_n \quad \text{Eqn. 16}$$

$$= \frac{2\pi f \exp[i k \cdot x_n(z)]}{\sinh(kh)}$$

$$\left[\cosh[k(h+z)]\left(\frac{k \cdot b_n}{k}\right) - i \sinh[k(h+z)](\hat{i}_z \cdot b_n)\right]$$

where $b_n$ is the unit vector pointing outward in the direction of the n$^{th}$ beam of the sonar system, $x_n(z)$ is the horizontal displacement vector for the range cell (m), and $\hat{i}_z$ is the unit vector in the vertical direction.

Note that the x origin should be chosen at the sonar system 100 (ADCP in the preferred embodiment) so that the horizontal component of the beam unit vector $b_n$ points in the same direction as $x_n$. The mapping among k, f and $f_{obs}$ are given by the linear dispersion relations and their inverses, which are calculated numerically.

For optional surface elevation measurements at each beam, the corresponding elements of H are computed as the phase adjustments needed to account for the effect of the horizontal displacements of the beams from the x origin:

$$H(x_n) = \frac{2}{a} \tilde{\eta} = \exp(i k \cdot x_n) \quad \text{Eqn. 17}$$

where $b_n$ is the unit vector pointing outward in the direction of the n$^{th}$ beam of the ADCP.

For the optional pressure measurement at the ADCP, the corresponding elements of H are:

$$H(z_{ADCP}) = \frac{2}{a} \tilde{p} = \rho g \cos \frac{h[k(h + z_{ADCP})]}{\cosh(kh)} \quad \text{Eqn. 18}$$

Once the sensitivity vector H is calculated per sub-step 346, the non-normalized wave directional spectrum D ($\theta$) is calculated per sub-step 348 (for the specific observed frequency under consideration) using the following MLM estimator: D($\theta$)

$$D(\theta) = \frac{N_D}{H^\dagger C^{-1} H} \quad \text{Eqn. 19}$$

where $H^{554}$ is the complex conjugate transpose of the sensitivity vector H, and $C^{-1}$ is the inverse of C. In the final sub-step 350 of FIG. 6d, the wave directional spectrum D is normalized such that:

$$\int_0^{2\pi} D\, d\theta = 1.$$

Figure 6E:
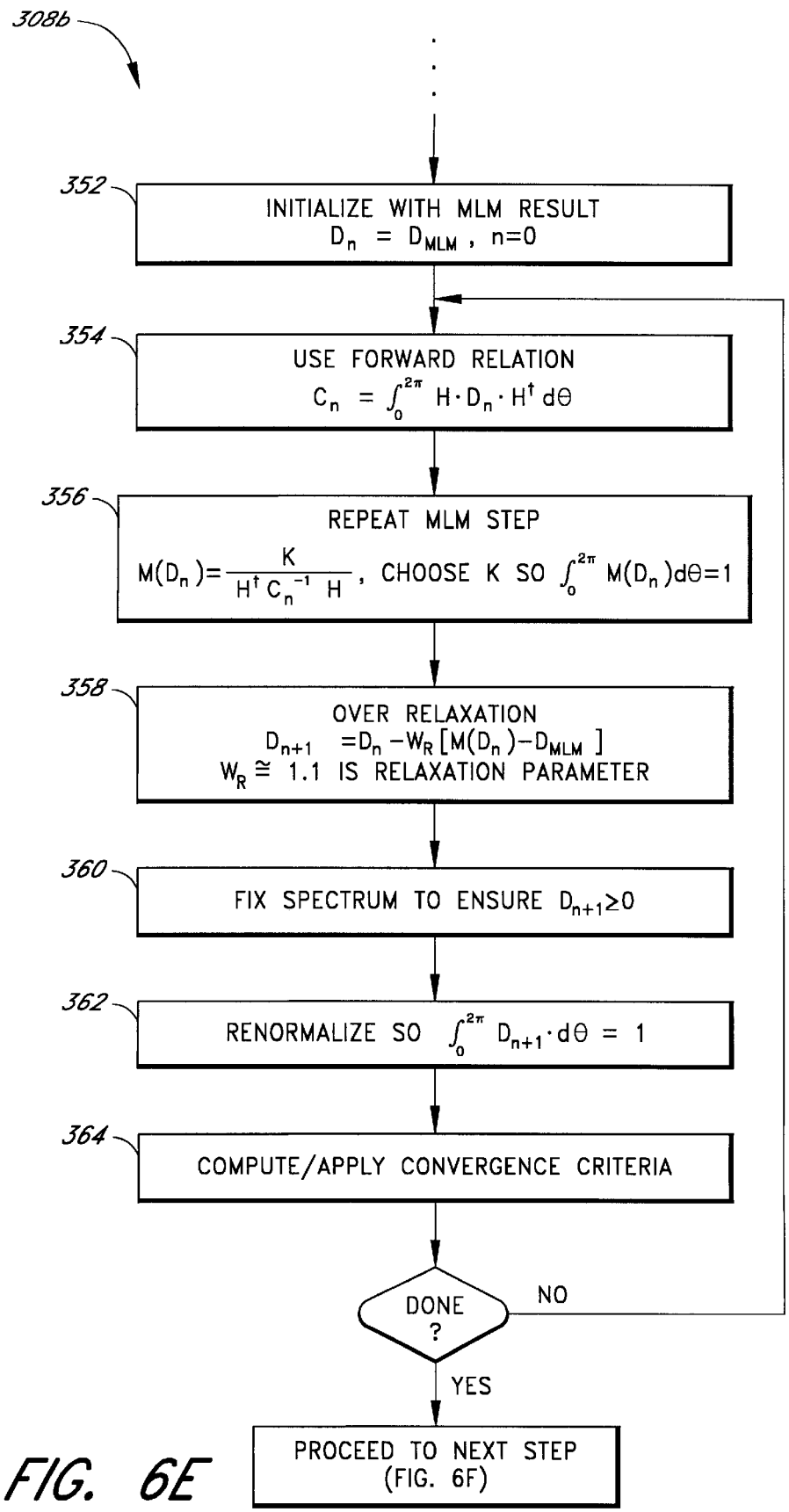
FIG. 6e is a flow diagram illustrating one exemplary embodiment of the iterative maximum likelihood method (IMLM) calculation function of the method of FIG. 6.

Referring now to FIG. 6e, the iterative maximum likelihood method (IMLM) step 308b of the algorithm of FIG. 6 is described. Note that this step 308b is optional, and may be bypassed for one or more observed frequencies as desired. As shown in FIG. 6e, the IMLM step 308b begins with the first sub-step 352 which is initialization with the normalized wave directional spectrum $D_n$ derived for each observed frequency in prior step 308a (Note that the subscript "n" on the wave directional spectrum D is an index used to denote the iteration number. Hence, when n=0, $D_n = D_{MLM}$). Next, the forward relation (eqn. 3 above) is used to compute the iterative cross-spectral coefficient matrix $C_n$ using the following relationship (sub-step 354):

$$C_n = \int_0^{2\pi} H D_n H^\dagger d\theta \qquad \text{Eqn. 20}$$

The MLM step 308 of the algorithm 300 is again repeated in sub-step 356 using the computed value of $C_n$ in order to derive the matrix M, as follows:

$$M(D_n) = \frac{K}{H^\dagger C_n^{-1} H} \qquad \text{Eqn. 21}$$

where K is chosen such that:

$$\int_0^{2\pi} M(D_n) d\theta = 1 \qquad \text{Eqn. 22}$$

Next, in sub-step 358, the index n is incremented by one (i.e., n+1) and the directional spectrum calculated according to the relationship:

$$D_{n+1} = D_n - \omega_R[M(D_n) - D_{MLM}] \qquad \text{Eqn. 23}$$

where $\omega_R$ is the relaxation parameter, which is chosen to be approximately 1.1 in the present embodiment.

In the next sub-step 360, the spectrum is fixed by zeroing negative values (or a similar procedure) to ensure that $D_{n+1}$ is greater than or equal to zero. Subsequently, the spectrum is renormalized in substep 362 so that:

$$\int_0^{2\pi} D_{n+1} d\theta = 1 \qquad \text{Eqn. 24}$$

Lastly, the convergence criteria is computed. (substep 364). Note that in the present embodiment of the algorithm 300, the convergence criteria are applied to each observed frequency (e.g., upon satisfying the IMLM convergence criteria for a given observed frequency, the MLM step 308a and optional IMLM step 308b are again performed for the next observed frequency). An exemplary set of criteria are as follows:

i. a fixed maximum number of iterations (typically 3 to 5) has occurred without meeting any other stopping criteria;
ii. the mean absolute difference in the smeared spectra integral $|\int(M(D_n) - D_{MLM}) d\theta|$ is greater than it was on the previous iteration;
iii. the relative squared difference in the measured and forward-relation cross-spectral matrices is less than a predetermined threshold value:

$$\sum_{i,j} \left[ \frac{(C_n - C_{i,j})^2}{(\sigma_{i,j})} \right] < \text{threshold value} \qquad \text{Eqn. 25}$$

where $\sigma_{i,j}$ is the estimated standard deviation of the i,j-th element of the measured C; or iv. the relative difference in the measured and predicted cross-spectral matrix C (Eqn. 25) is greater than it was on the previous iteration.

The above-listed convergence criteria are applied such that satisfaction of any one (or more) of the criteria will terminate further iteration (for the observed frequency under analysis). When all observed frequencies have been analyzed, the algorithm then proceeds to the final algorithm step 309.

As previously noted, the convergence criteria described herein are but one embodiment, and other criteria or mechanisms for terminating the IMLM iteration process may be substituted depending on the specific application of the algorithm and the needs of the user.

Figure 6F:
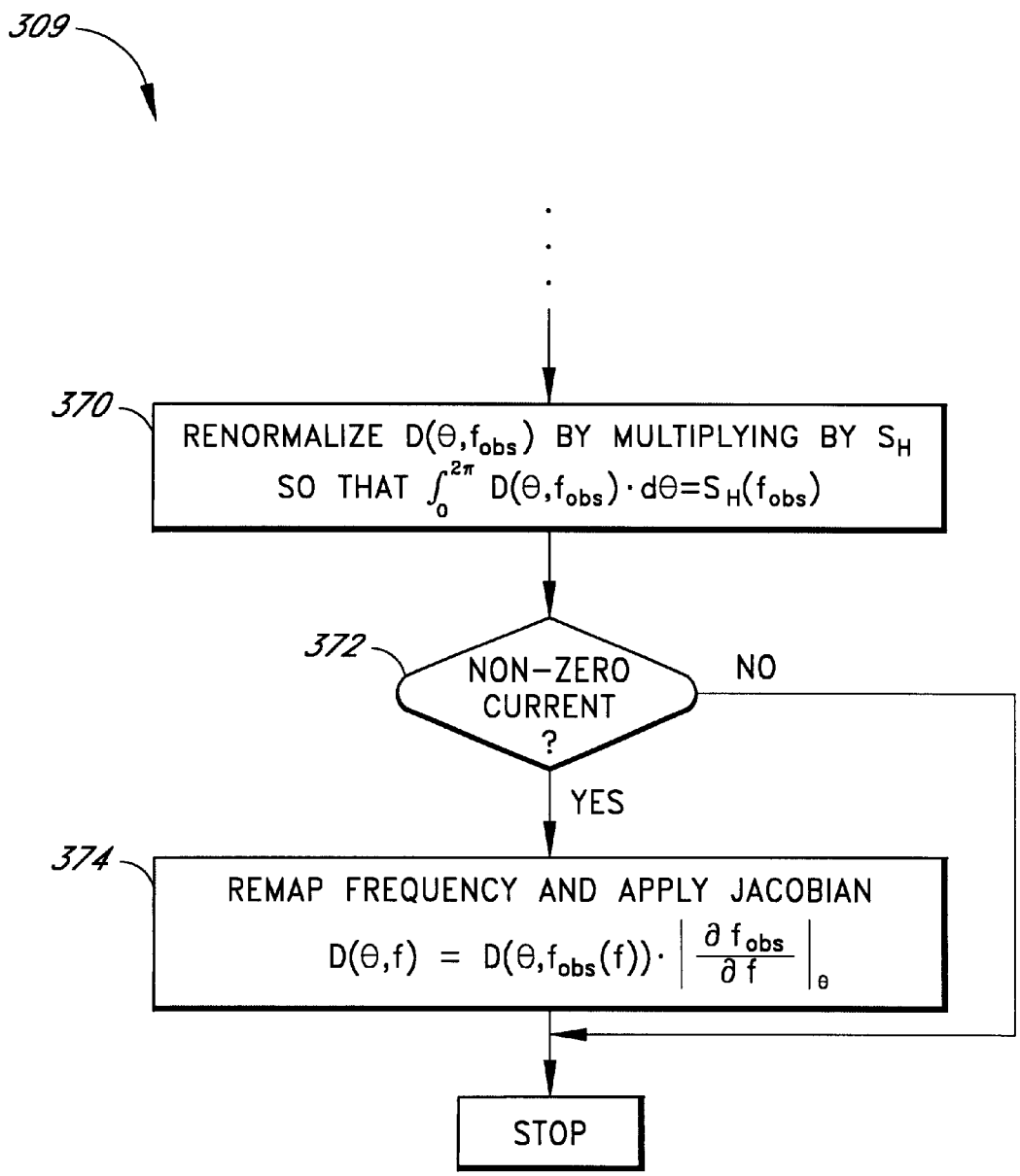
FIG. 6f is a flow diagram illustrating one exemplary embodiment of the function of constructing the two-dimensional wave directional spectrum $D(\theta, f)$ according to the method of FIG. 6.

The final step 309 in the algorithm of FIG. 6 is now described. As shown in FIG. 6f, the complete two-dimensional wave directional spectrum is constructed by 1) renormalizing the observed frequency-dependent wave directional spectrum 370; 2) determining the presence of a non-zero current 372, and 3) in the event of non-zero current, remapping the frequency and applying the Jacobian operator 374.

Renormalization of $D(\theta, f_{obs})$ is accomplished by multiplying by $S_H$ that:

$$\int_0^{2\pi} D(\theta, f_{obs}) d\theta = S_H(f_{obs}). \qquad \text{Eqn. 26}$$

Next, the magnitude of the current is examined, and if no current is present (magnitude=0), no further analysis or computation is performed, and the calculation of $D(\theta, f_{obs})$ is complete. If, however, a non-zero current is present, the frequency is remapped using Eqn. 2, either by interpolating to a regular grid or plotting with a distorted frequency axis (that is, non-linear in observed frequency, linear in intrinsic frequency), and the Jacobian J is applied such that:

$$D(\theta, f) = D(\theta, f_{obs}\{f\}) J \qquad \text{Eqn. 27}$$

Where $$J = \left| \frac{\partial f_{obs}}{\partial f} \right|_\theta \qquad \text{Eqn. 28}$$

Referring now to FIGS. 7 through 10, output from the aforementioned algorithm 300 at various stages of the calculation process is illustrated.

Figure 7:
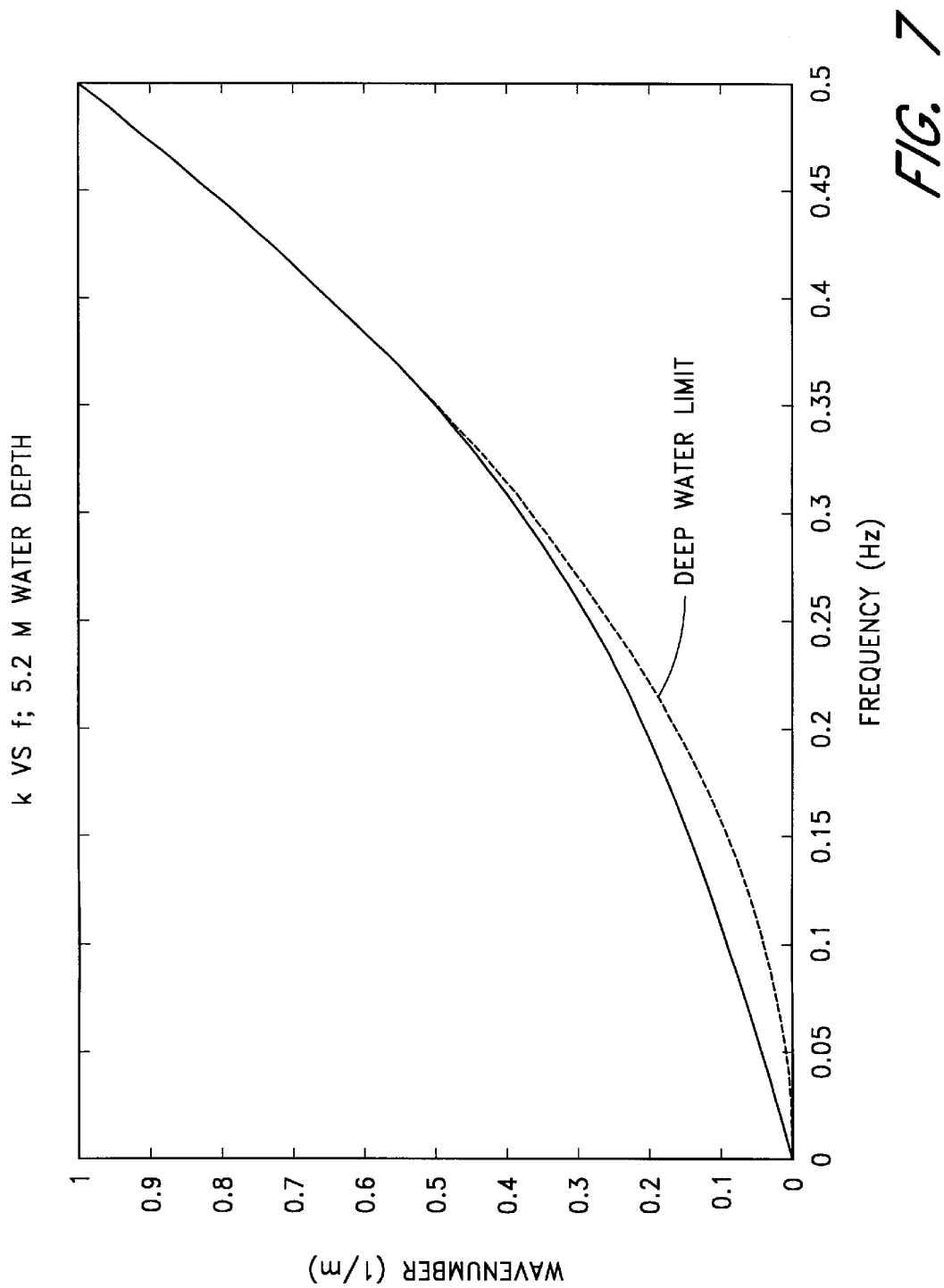
FIG. 7 is a plot of the linear wave dispersion relation obtained from an experimental deployment of the WDS measurement system using an embodiment of the present invention.

FIG. 7 is an exemplary plot of the linear wave dispersion relation (eqn. 2) obtained from an experimental deployment of the WDS measurement system of the present invention.

Figure 8:
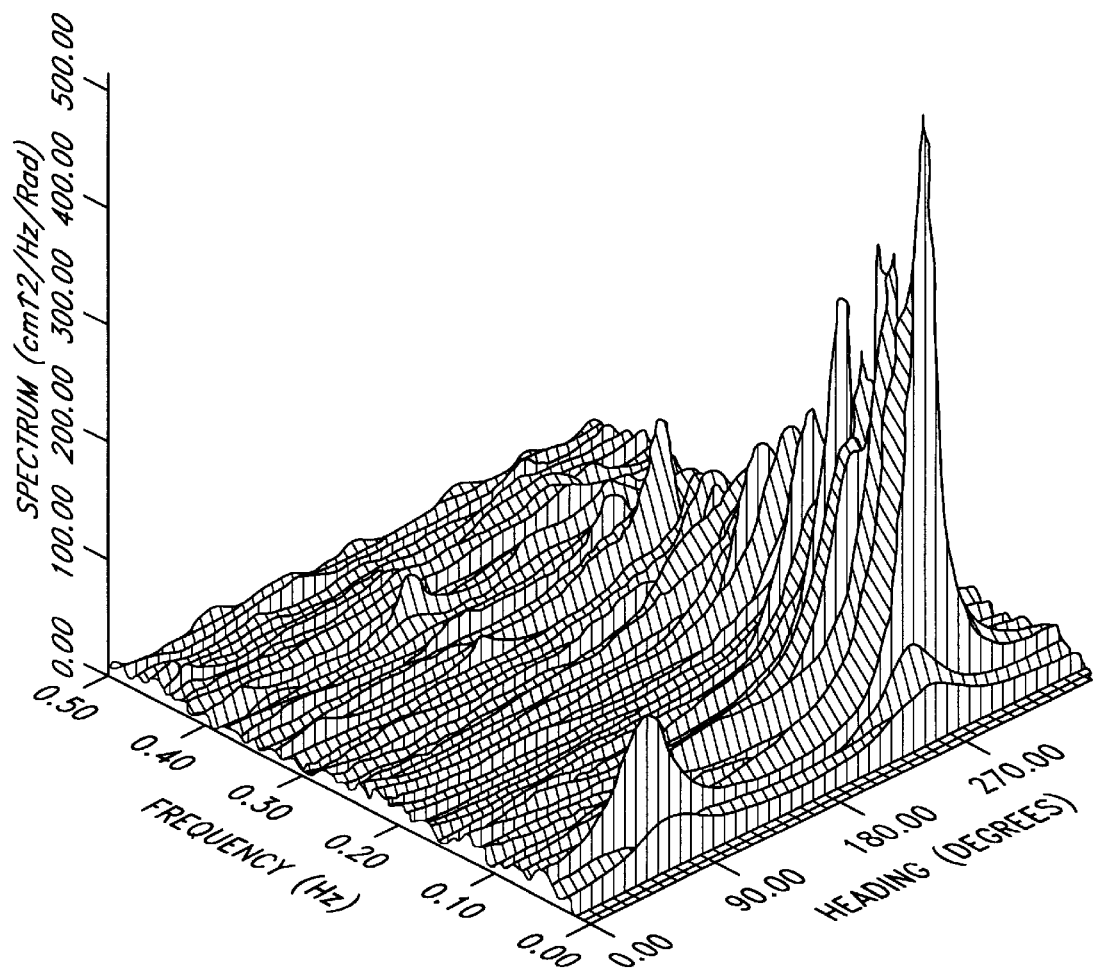
FIG. 8 is a mesh plot of an exemplary maximum likelihood method(MLM) estimate of the directional wave spectrum generated using an embodiment of the present invention.

FIG. 8 is a mesh plot of an exemplary maximum likelihood method (MLM) estimate of the directional wave spectrum generated using the present invention.

Figure 9:
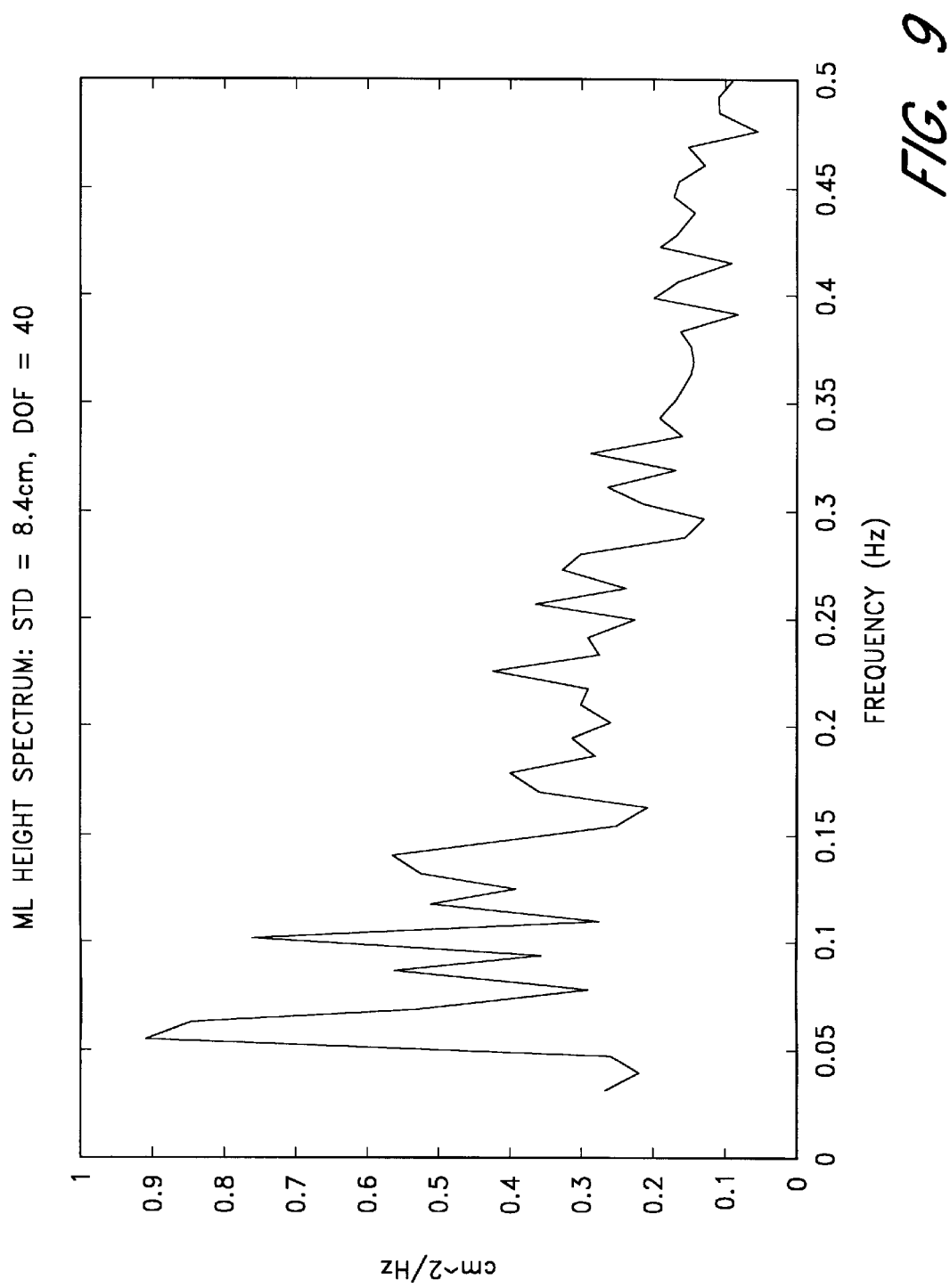
FIG. 9 is a wave height spectrum obtained by integrating the spectra of FIG. 8 over all azimuthal angles.

FIG. 9 is a wave height spectrum obtained by integrating the spectra of FIG. 8 over all azimuthal angles.

Figure 10:
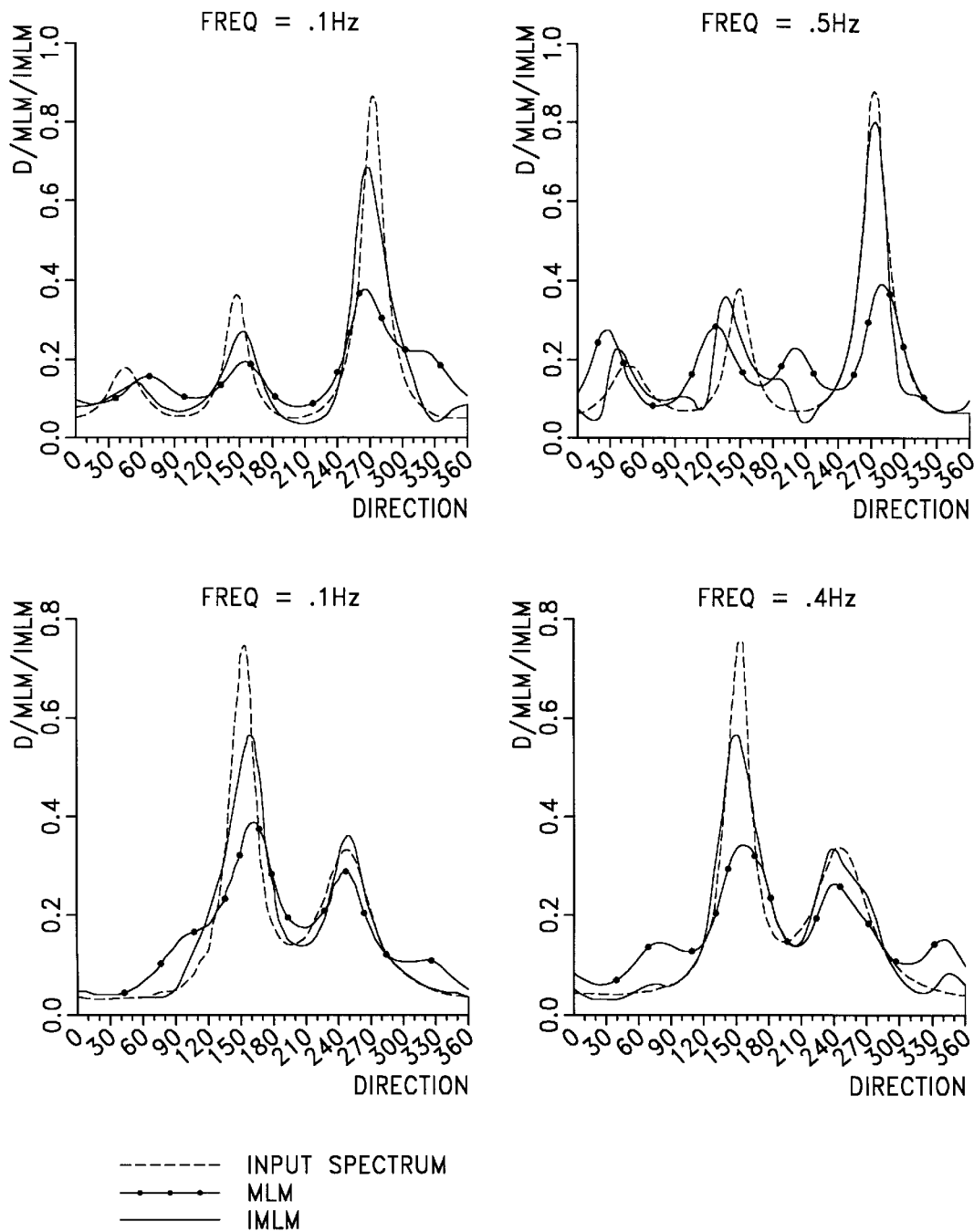
FIG. 10 is a plot comparing estimates of wave directional spectrum versus azimuth for various input spectra as derived using both the maximum likelihood and iterative maximum likelihood methods.

FIG. 10 is a comparison of estimates of wave directional spectrum versus azimuth for various input spectra as derived using both the maximum likelihood and iterative maximum likelihood methods, using a known directional spectrum to simulate a cross-spectral matrix C. Note the improved performance of the IMLM estimate as compared to the MLM estimate.

Calculation of Wave Height

As previously described, the wave directional measurement system of the present invention is further capable of calculating the significant wave height associated with waves in a the fluid medium. Specifically, the significant wave height Hs (measured in meters) is calculated as 4 times the square root of the area under the wave height spectrum SH (see previous discussion of FIG. 6b for derivation of wave height spectrum) over the frequency range of interest, typically 0.03 to 0.5 Hz. This frequency range is expected to be dominated by waves rather than tidal fluctuations or noise. This calculation is similarly performed using the processors of the ADCP and/or as a post-processing task on an external computer.

While the above detailed description has shown, described and pointed out the fundamental novel features of the invention as applied to various embodiments, it will be understood that various omissions and substitutions and changes in the form and details of the device illustrated may be made by those skilled in the art, without departing from the concepts of the invention. It should be further noted that while the present invention has been described in terms of a device and method useful in an underwater environment such as an ocean, harbor, or lake, it may also find application in other types of fluid mediums.

Appendix I*

*Nomenclature may vary from that used in "Detailed Description" section

A1. The Array Response to Waves

The sonar system 100 of FIG. 2a is presumed to be oriented as shown in FIG. 4, with the beams sequentially numbered from 1 to n, (n=4 in FIG. 2a) and having a coordinate system with z positive upwards (toward the surface, so that the fluid medium occupies the region 0>z>−d. The x-axis is assumed to lie along beams 1 and 3, with positive x pointing outwards along beam 1. Beams 2 and 3 respectively lie along the positive and negative y-axis. The coordinates of a range cell satisfy $z=\sqrt{x^2+y^2}/\tan\alpha$, where $\alpha$ is the beam angle with respect to the vertical.

We denote the component of velocity along the $\lambda$-th beam ($\lambda=1,\ldots n$) by $V_\lambda(\underline{x},t)$ (where $\underline{x}$ is taken to lie at the center of a range bin); $\underline{u}(\underline{x},t)$ denotes the physical wave velocity vector at location $\underline{x}$. Taking a Fourier transform of these variables with respect to time yields the amplitudes $\underline{\hat{V}}(\underline{x},\omega)$ respectively.

The relation between these amplitudes can be written as $$\begin{bmatrix} \hat{V}_1(x,\omega) \\ \hat{V}_2(x,\omega) \\ \hat{V}_3(x,\omega) \\ \hat{V}_4(x,\omega) \end{bmatrix} = \begin{bmatrix} \sin\alpha & 0 & \cos\alpha \\ -\sin\alpha & 0 & \cos\alpha \\ 0 & \sin\alpha & \cos\alpha \\ 0 & -\sin\alpha & \cos\alpha \end{bmatrix} \begin{bmatrix} \hat{u}_1(\underline{x},\omega) \\ \hat{u}_2(\underline{x},\omega) \\ \hat{u}_3(\underline{x},\omega) \end{bmatrix} \quad \text{A1.1}$$

or more compactly in matrix form as $$\underline{\hat{V}}(\underline{x},\omega)=A(\alpha)\underline{\hat{u}}(\underline{x},\omega) \quad \text{A1.2}$$

The 4×4 cross-spectral matrix $$C(\underline{x},\underline{x}'|\omega)=<\underline{\hat{V}}(\underline{x},\omega)\underline{\hat{V}}^\dagger(\underline{x}',\omega)> \quad \text{A1.3}$$

must ultimately be related to the wave direction spectrum $D(\omega,\theta)$. Note that $\underline{\hat{V}}(\underline{x},\omega)$ is the Fourier amplitude at angular frequency $\omega$, "†" signifies the complex conjugate transpose, and $<\ldots>$ denotes a statistical average over realizations of $\hat{V}$.

Substituting equation A1.2 into A1.3 gives $$C(\underline{x},\underline{x}'|\omega)=A<\underline{u}(\underline{x},\omega)\underline{u}^\dagger(\underline{x}',\omega)>A^t \quad \text{A1.4}$$

where "t" denotes the transpose.

For linear waves propagating in water of depth d, $\hat{u}$ is given by $$\underline{\hat{u}}(\underline{x},\omega)=\int d^2k\,\underline{\Pi}(\underline{k},\omega)\hat{\eta}(\underline{k},\omega) \quad \text{A1.5}$$

where $\hat{\eta}(\underline{k},\omega)$ is the Fourier amplitude of the surface displacement field at angular frequency $\omega$ and wavenumber $\underline{k}=(k_x,k_y)$, $$\underline{\Pi}(\underline{k},\omega|\underline{x}) = \frac{w}{k}e^{i\underline{k}\cdot\underline{x}}(k_xF, k_yF, -ikF'), \quad \text{A1.6}$$

$F(kz) = \cosh(k(z+d))/\sinh(kd)$, and $F'(x) = dF/dx$.

Then C becomes $$C(\underline{x},\underline{x}'|\omega)=\int d^2k\,A\underline{\Pi}\Psi(\underline{k},\omega)\underline{\Pi}^\dagger A^\dagger \quad \text{A1.7}$$

where $\Psi(k,\omega)$ denotes the frequency/wavenumber spectrum of $\eta(\underline{x},t)$.

Equation A1.7 is the forward relation between C and $\Psi$, and defines a 3-dimensional inversion problem. This can be reduced to a 2-dimensional estimation problem by using the dispersion relation, defined by $$\omega^2=gk\tanh(kd),\ k\equiv|\underline{k}| \quad \text{A1.8}$$

where g=9.8 m/s is the acceleration due to gravity.

This relation can be used to define frequency and frequency/direction spectra (denoted by $S(\omega)$ and $D(\omega,\theta)$ respectively) via $$\Psi(\underline{k},\omega)d^2\underline{k}=\delta(\omega-\sigma)S(\sigma)D(\sigma,\theta)d\sigma d\theta \quad \text{A1.9}$$

where $\delta$ is the Dirac delta function, and $\sigma(k)$ satisfies the dispersion relation A1.8 for each wavenumber k. The direction spectrum is normalized to unity area $$\int_{-\pi}^{+\pi} d\theta D(\omega,\theta) = 1 \quad \text{A1.10}$$

Substituting into equation A1.7, we have $$C(x,x'|\omega) = \int_{-\pi}^{+\pi} d\theta H(\theta,\omega|x')D(\omega,\theta)\underline{H}^\dagger(\theta,\omega|x) \quad \text{A1.11}$$

where $\underline{H}(\theta,\omega|x)=A(\alpha)\underline{\Pi}(\underline{k}(\omega),\omega|x)$, and $\underline{k}(\omega)$ satisfies the dispersion relation for frequency $\omega$.

Since the wave field is stationary then (except for some short-range correlations introduced by windowing) the various spectral bands in frequency are uncorrelated, and equation A1.11 can be considered to hold for each frequency separately.

Finally, for later purposes, it is easier to consider equation A1.11 as a single matrix equation at each frequency, rather than as a 4×4 matrix equation for each spatial separation $\underline{x}-\underline{x}'$. So we assume that the N range cells along each of the four beams have been ordered in a list (the order is unimportant). Then C becomes a 4 N×4 N matrix, and H becomes 4 N×1. Note that C is still complex conjugate symmetric, and so only 2 N(4 N+1) elements are independent.

When ordered in this way, the dependence on $\underline{x}$ and $\underline{x}'$ can be omitted, and equation A1.11 written as $$C = \int_{-\pi}^{+\pi} d\theta H(\theta)D(\theta)H^\dagger(\theta) \quad \text{A1.12}$$

where it is understood that a separate equation for each frequency is implied. Note, if we consider a plane wave propagating in the direction $\theta_o$, then $D(\theta)=\delta(\theta-\theta_o)$, and $C=\underline{H}(\theta_o)\underline{H}^\dagger(\theta_o)$, so that H gives the directional response of the array.

Equation A1.12 connects a finite set of data (contained in C) to the continuous function $D(\theta)$. This expression can be converted into a matrix equation suitable for parameter estimation by approximating D by a finite set of coefficients. As before, since different frequencies are uncorrelated, separate matrix equations for each Fourier harmonic will be obtained. To accomplish this requires several steps. First, the N independent elements of the matrix C at each frequency are listed as a column vector. Note that the order is not important. The outer product $\underline{H}(\theta_o)\underline{H}^\dagger(\theta_o)$ is similarly reordered. The continuous integration is then approximated by a finite sum. There are, of course, an infinite number of ways to do this—the integral can be approximated using a trapezoidal or Simpson's rule, or expand D in a set of orthogonal functions. Perhaps the most natural expansion in this case is to write D as a Fourier series.

$$D = \sum_{-\infty}^{+\infty} a_n e^{in\theta} \qquad \text{A1.13}$$

Truncating this series at P terms, and substituting into equation A2.1 gives $$\underline{C} = M\underline{a} \qquad \text{A1.14}$$

where $$\underline{a} = \left(a - \frac{P}{2}, \ldots, a + \frac{P}{2}\right)$$

is a P×1 column vector of directional Fourier amplitudes (the superscript "t" denotes transpose), $\underline{C}$ is an N×1 column vector, and $$M = \int_{\pi}^{+\pi} d\theta \underline{H}(\theta) \underline{H}^\dagger(\theta) e^{in\theta} \qquad \text{A1.15}$$

$$= A(\alpha) \left[ \int_{\pi}^{+\pi} d\theta \underline{H}(\theta) \underline{H}^\dagger(\theta) e^{in\theta} \right] A'(\alpha) \qquad \text{A1.16}$$

is a N×P matrix. From equation A1.6 we have $$\underline{H}(\theta) = \omega e^{ik(r_x \cos\theta + r_y \sin\theta)} (F \cos\theta, F \sin\theta, -iF')^t$$

where $F(kz) = \cos h(k(z+d))/\sin h(kd)$, and $F'(x) = dF/dx$. We have used $\underline{r} = (r_x, r_y) = \underline{x} - x'$ to denote the vector separation between range bins.

Hence the expression for M in equation A1.14 is seen to involve terms such as $$\begin{bmatrix} 1 \\ \cos\theta \\ \sin\theta \\ \cos 2\theta \\ \sin 2\theta \end{bmatrix}_n = \int_{-\pi}^{+\pi} d\vartheta e^{in\theta} e^{ik(r_x \cos\theta + r_y \sin\theta)} \begin{pmatrix} 1 \\ \cos\theta \\ \sin\theta \\ \cos 2\theta \\ \sin 2\theta \end{pmatrix} \qquad \text{A1.17}$$

where $$r = \sqrt{r_x^2 + r_y^2},$$

$\phi = \tan(r_y/r_x)$, and $[ \ldots ]_n$ denotes the function on the right-hand side of equation A1.19.

The various terms above can be expressed in terms of the more primitive integral $[e^{ip\theta}]_n$, which in turn can be evaluated in terms of Bessel functions as follows:

$$[e^{ip\theta}] = \int_{-\pi}^{+\pi} d\theta e^{ip\theta} e^{ikr\cos(\theta-\varphi)} e^{in\theta} \qquad \text{A1.18}$$

$$= 2\pi(i)^{n+p} e^{i(n+p)\varphi} J_{n+p}(kr) \qquad \text{A1.19}$$

where $J_n(x)$ is a Bessel function of the first kind of degree n.

Hence, $$([\cos p\theta])_n = 2\pi(i)^{n+p} \frac{1}{2} e^{in\varphi}[e^{ip\varphi} J_{n+p}(kr) - (-)^p e^{ip\varphi} J_{n+p}(kr) \qquad \text{A1.20}$$

and $$[\sin p\theta]_n = 2\pi(i)^{n+p} \frac{1}{2i} e^{in\varphi}[e^{ip\varphi} J_{n+p}(kr) - (-)^p e^{ip\varphi} J_{n+p}(kr)] \qquad \text{A1.21}$$

These expressions permit M to be evaluated in terms of known functions at each frequency (and therefore each wavenumber).

A2. The Maximum-Likelihood Method (MLM)

To form the MLM estimator, it is assumed that D can be expressed as a linear function of the data:

$$D(\theta) = \gamma(\theta)^\dagger C \gamma(\theta) \qquad \text{A2.1}$$

where the steering vector, $\gamma(\theta)$, is determined by minimizing the power in all directions, subject to the constraint that the signal associated with a plane wave is passed with unity gain. The solution for the weights can be obtained using a Lagrange multiplier and is given by $$\gamma(\theta) = \frac{C^{-1}H}{H^\dagger C^{-1} H} \qquad \text{A2.2}$$

where $C^{-1}$ is the inverse of C, which is computed using a singular-value decomposition. Note that $\gamma(\theta)$ is a function of both the array geometry/response and the data through its dependence on H and C. Then the MLM estimator can be written $$D(\theta) = \frac{N_D}{H^\dagger C^{-1} H} \qquad \text{A2.3}$$

where the normalization constant, $N_D$, is chosen so that D has unit area. The MLM estimator is "data-adaptive" is the sense that it uses the data to obtain filter weights $\gamma$ that for any given "look-direction" minimize the power coming from other directions. As a consequence, the expected value of the MLM estimate is the convolution of the true spectrum D with a window that depends on D. Since the window is a priori unknown, it is not possible to deconvolve it directly and another approach, such as the iterative maximum likelihood method (IMLM), must be employed.

Although the off-diagonal elements of the data covariance matrix C are not biased, they are subject to sampling variability—their estimates converging to the true cross-spectra as the degrees-of-freedom $N_C$ tends to infinity. This uncertainty translates into a mean-square error in the magnitude of D (Capon and Goodman, 1970) as $$var(D) = \frac{1}{N_C - L + 1} E[D]^2 \qquad \text{A2.4}$$

where var( ... ) and E[ ... ] denote the variance and expected value respectively, $N_C$ is the number of degrees-of-freedom in the estimate of C, and L is the number of range cells used (C has dimension L×L). In addition to this sampling error, the diagonal elements of C are biased by the Doppler phase noise. The expected magnitude of this bias depends weakly on range through the acoustic signal-to-noise ratio, but to first order is roughly isotropic and independent of depth, and hence adds a constant to the diagonal elements of C. Intuitively, it is expected that this contribution will raise the overall level of the spectrum, and will tend to appear more strongly where the array sidelobes are largest.

A3. The Iterative Maximum-Likelihood Method (IMLM)

The IMLM estimator was proposed by Pawka (1983) for the analysis of pressure-gage-array observations of wave direction, and later applied to PUV observations by Oltman-Shay and Guza (1984). Krogstad et al. (1988) used the technique to obtain wave direction from velocity observations taken with a horizontal-beam sonar.

The major difficulty with the MLM estimate is that it is not consistent, in the sense that the forward relation (2) applied to the MLM estimate $D_{ML}$ does not reproduce the observed covariance, C, and therefore the MLM method does not yield a true power spectral density.

However, it is possible to define a heuristic iteration scheme that enforces consistency in an approximate way. Consider the nonlinear operator, N, defined by $$N: D \xrightarrow{\text{forward}} C \xrightarrow{\text{inverse}} N(D) \qquad \text{A3.1}$$

The problem is to find a spectrum D that satisfies $$N(D) = D_{ML}, \qquad \text{A3.2}$$

where $D_{MLM}$ denotes the original MLM estimate based on the observed covariance matrix, C.

Krogstad et al. propose the following iteration scheme for the approximate solution of equation 11

$$D_{n+1} = D_n + \lambda[D_{ML} - N(D_n)] \qquad \text{A3.3}$$

where $D_0 = D_{MLM}$, and $\lambda$ is a relaxation parameter that can be freely chosen. In practice, Krogstad et al. find reasonable convergence after 4–6 iterations for $\lambda$'s slightly greater than unity (typically in the range 1.1–1.4). Note that once the initial estimate has been computed, the iteration can proceed without further reference to the data covariance, C.

In general, the IMLM estimate more closely follows the input spectrum than the MLM estimate, and the widths, especially in the region of the dominant peak, are also in better agreement.

A4. The Eigenvector (EV) Technique

The EV method (Johnson, 1982) is another high-resolution bearing estimator. The basic idea is to decompose the data matrix into a signal and an orthogonal residual, which we identify as the noise subspace. To formulate the problem more specifically, it assumed that m range cells are being used, and model the array output as $$d(t) = As(t) + n(t) \qquad \text{A4.1}$$

Here d is an m×1 vector of observations, s is a p×1 vector of (unknown) random signals, n is an m×1 vector of Gaussian noise (assumed to be independent of the signals), and A is an m×p matrix characterizing the array response. Taking the Fourier transform of this equation and forming the cross-spectral matrix gives $$C = ASA^\dagger + N \qquad \text{A4.2}$$

where S and N are respectively the signal and noise covariances, and all quantities depend on frequency.

The first considered is where the columns of A are linearly independent and there are fewer signals than data—e.g. p<m. The EV algorithm estimates the signal directions by finding the orthogonal noise subspace. Operationally, the separation is accomplished by an eigenvector decomposition of the data matrix C. Since the eigenvectors are orthogonal and p<m, then m−p eigenvectors will be orthogonal to the signal subspace. We denote these eigenvectors and the corresponding eigenvalues by $\{\hat{n}_j\}$ and $\{\lambda_j\}$ respectively, where j=1,...n−p. Then to the extent that the array response function H is a good representation of the signal, the projection of H on $\{\hat{n}_j\}$ will vanish for angles corresponding to incident waves (e.g. signals) and will be non-zero otherwise. Similarly, any weighted sum of projections (or their magnitude-squared) will vanish, and the reciprocal will display sharp peaks at signal directions. Taking equal weights gives the MUSIC algorithm (Schmidt, 1986). The EV estimator uses the inverse of the noise eigenvalues as weights, and can be written as $$D = \frac{N_D}{\sum_{j=1}^{m-p} \lambda_j^{-1} |H^\dagger \hat{n}_j|^2} = \frac{N_D}{H^\dagger C_N^{-1} H} \qquad \text{A4.3}$$

where $C_N$ is the restriction of C to the noise subspace, and $N_D$ is a normalization constant. One might expect that this is a somewhat better estimator since it emphasizes eigenvectors that are more "noise-like" (e.g. those having smaller eigenvalues).

As an aside, we note that in the limit that the number of signals tend to zero, the EV estimator in equation A4.3 becomes identical with the MLM estimator given in equation 19.

In concluding this section, it is emphasized the fact that the EV algorithm is a bearing estimator. Its attraction lies in its simplicity and computational speed—to estimate the directional power density it must still be followed by the iterative IEV. Simulation results demonstrate that the EV can provide a useful estimate of the dominant wave directions when a lower bound on the noise dimension can be obtained.

What is claimed is:

1. A system for measuring the directional spectrum of waves in a fluid medium having a substantially planar surface, comprising:

a sonar system having a plurality of transducers for generating respective acoustic beams and receiving echoes from one or more range cells located substantially within the beams, the beams being inclined at a non-zero angle with respect to the surface of the fluid medium; and a computer program executed by a processor for calculating the directional spectrum associated with the waves from the received echoes, wherein the computer program utilizes a sensitivity vector as part of the calculation of the directional spectrum, and wherein said computer program utilizes iterative maximum likelihood processing for at least a part of said calculation.

2. The system of claim 1, wherein the sonar system comprises a broadband acoustic Doppler current profiler (ADCP).

3. The system of claim 1, wherein the received echoes are related to the current velocity within the range cells.

4. The system of claim 1, wherein the transducers are arranged in the Janus configuration.

5. The system of claim 1, wherein the transducers are in a phased array configuration.

6. The system of claim 1, wherein the calculation of the directional spectrum includes:

calculating a non-directional wave height spectrum;

calculating a cross-spectral matrix;

calculating the directional spectra at each observed frequency; and calculating the dimensional directional spectrum form the non-directional wave height spectrum, the cross-spectral matrix, the directional spectra, and the sensitivity vector.

7. The system of claim 1, wherein the fluid medium is at least in part water.

8. A Doppler sonar system for measuring the directional spectrum of waves in a fluid medium having a substantially planar surface, comprising:

a signal generator for generating a transmitted signal;

a plurality of transmitting transducers operatively connected to the signal generator, the transducers generating acoustic beams based on the transmitted signal and projecting the beams into the fluid medium, the acoustic beams further having an angular relationship to the surface of the fluid medium;

a plurality of receiving transducers for receiving samples from one or more range cells located substantially within the acoustic beams, and producing a received signal relating to the samples;

a signal processor capable of processing the received signal; and a computer program, executed at least in part on the signal processor, for calculating the directional spectrum associated with the waves based on the received signal, wherein the computer program utilizes a sensitivity vector as part of the calculation of the directional spectrum, and wherein said computer program utilizes iterative maximum likelihood processing for at least a part of said calculation.

9. The sonar system of claim 8, wherein the transmitting and receiving transducers are embodied within at least one unitary transducer element.

10. The sonar system of claim 8, wherein the transducers are arranged in the Janus configuration.

11. A method of measuring the directional spectrum of waves in a fluid medium using a sonar system having an upward or downward looking transducer configuration, comprising:

generating one or more acoustic beams from the transducer configuration;

measuring the current velocities within one or more range cells of the acoustic beams;

forming a sensitivity vector related to the transducer configuration using a linear wave model; and forming a wave directional spectrum matrix using the measured current velocities and the sensitivity vector by performing iterative maximum likelihood method processing.

12. A computer program used with a sonar system for calculating the two-dimensional directional spectrum of a wave in a fluid medium from at least one set of received echoes, comprising:

a data processor for processing the signals representative of the received echoes;

means for calculating a non-directional wave height spectrum from the signals processed by the data processor;

means for generating a cross-spectral matrix from the signals;

a sensitivity vector generator, wherein a sensitivity vector is generated relating to the configuration of the transducers of the sonar system; and a two-dimensional directional spectrum estimator, the estimator calculating the directional spectrum from the non-directional wave height spectrum, the cross-spectral matrix, and the sensitivity vector by performing iterative maximum likelihood method processing for at least a part of said calculating.

13. The system of claim 1, wherein the processor is independent from the sonar system.

14. The system of claim 1, wherein the processor is included in the sonar system.

15. The system of claim 1, wherein the processor comprises a signal processor.

16. A system for measuring the directional spectrum of waves in a fluid medium according to claim 1, wherein the iterative maximum likelihood processing comprises:

(a) performing a maximum likelihood method processing to calculate a directional spectrum;

(b) computing an iterative cross-spectral coefficient matrix using a forward relation;

(c) performing maximum likelihood method processing using said iterative cross-spectral coefficient matrix to calculate a matrix M; and (d) iterating said directional spectrum using said matrix M.

* * * * *